US011750887B2

(12) United States Patent
Cobb

(10) Patent No.: US 11,750,887 B2
(45) Date of Patent: Sep. 5, 2023

(54) DIGITAL CONTENT CONTROLLER

(71) Applicant: Black Wave Adventures, LLC, Rochester, MI (US)

(72) Inventor: Daniel B. Cobb, Rochester, MI (US)

(73) Assignee: Black Wave Adventures, LLC, Rochester, MI (US)

( * ) Notice: Subject to any disclaimer, the term of this patent is extended or adjusted under 35 U.S.C. 154(b) by 41 days.

(21) Appl. No.: 16/553,608

(22) Filed: Aug. 28, 2019

(65) Prior Publication Data

US 2019/0387275 A1 Dec. 19, 2019

Related U.S. Application Data

(63) Continuation-in-part of application No. 16/262,397, filed on Jan. 30, 2019, which is a continuation of application No. 14/384,973, filed as application No. PCT/US2013/032216 on Mar. 15, 2013, now Pat. No. 10,231,019.

(60) Provisional application No. 61/611,357, filed on Mar. 15, 2012.

(51) Int. Cl.
*H04N 21/454* (2011.01)
*H04N 21/475* (2011.01)

(52) U.S. Cl.
CPC ..... *H04N 21/4542* (2013.01); *H04N 21/4751* (2013.01)

(58) Field of Classification Search
CPC ........... H04N 21/4542; H04N 21/4751; H04N 21/47; H04N 21/812; H04N 21/4532; H04N 21/4828; H04N 21/4755; G06Q 30/0241; G06Q 30/0271; G06Q 30/0276; G06Q 30/0277; G06Q 30/0257
See application file for complete search history.

(56) References Cited

U.S. PATENT DOCUMENTS

| | | | | |
|---|---|---|---|---|
| 5,973,683 A | * | 10/1999 | Cragun | H04N 21/4782 709/217 |
| 6,317,795 B1 | | 11/2001 | Malkin et al. | |
| 8,312,484 B1 | * | 11/2012 | McCarty | H04N 21/812 725/27 |
| 8,666,811 B1 | * | 3/2014 | Chen | G06Q 30/02 705/14.47 |
| 9,253,609 B2 | * | 2/2016 | Hosier, Jr. | H04W 4/08 |
| 2002/0147782 A1 | | 10/2002 | Dimitrova et al. | |
| 2005/0010952 A1 | | 1/2005 | Gleissner et al. | |
| 2005/0028191 A1 | | 2/2005 | Sullivan et al. | |
| 2008/0172689 A1 | | 7/2008 | Feder et al. | |
| 2008/0235731 A1 | | 9/2008 | Bryant et al. | |
| 2009/0234667 A1 | | 9/2009 | Thayne | |

(Continued)

OTHER PUBLICATIONS

International Search Report PCT/US2013/032216.

*Primary Examiner* — Ngoc K Vu
(74) *Attorney, Agent, or Firm* — FisherBroyles LLP

(57) ABSTRACT

A content controller system and method may include a user interface device in communication with a user interface device. The user interface device may provide operations including select advertising media content, select positive and negative content placement associations for the advertising media content, and automatically place the advertising media content in response to the positive content placement areas and away from at least one of the negative content placement areas.

26 Claims, 28 Drawing Sheets

(56) References Cited

U.S. PATENT DOCUMENTS

| | | | |
|---|---|---|---|
| 2009/0234745 A1* | 9/2009 | Ramer | G06Q 30/0222 |
| | | | 705/14.23 |
| 2009/0254824 A1* | 10/2009 | Singh | G06Q 30/0267 |
| | | | 715/716 |
| 2010/0070510 A1 | 3/2010 | Agarwal et al. | |
| 2010/0088182 A1* | 4/2010 | Ryder | G06F 17/00 |
| | | | 705/14.66 |
| 2010/0094866 A1 | 4/2010 | Cuttner et al. | |
| 2010/0122293 A1 | 5/2010 | Craner | |
| 2010/0293063 A1* | 11/2010 | Atherton | G06Q 30/02 |
| | | | 705/14.73 |
| 2011/0065419 A1 | 3/2011 | Book et al. | |
| 2011/0283311 A1 | 11/2011 | Luong | |
| 2012/0004982 A1* | 1/2012 | Cohee | G06Q 30/02 |
| | | | 705/14.42 |
| 2012/0054789 A1 | 3/2012 | Evans et al. | |
| 2012/0060181 A1 | 3/2012 | Craner | |
| 2013/0047260 A1 | 2/2013 | Hoefel et al. | |
| 2017/0316465 A1* | 11/2017 | Titus | G06Q 30/0276 |

\* cited by examiner

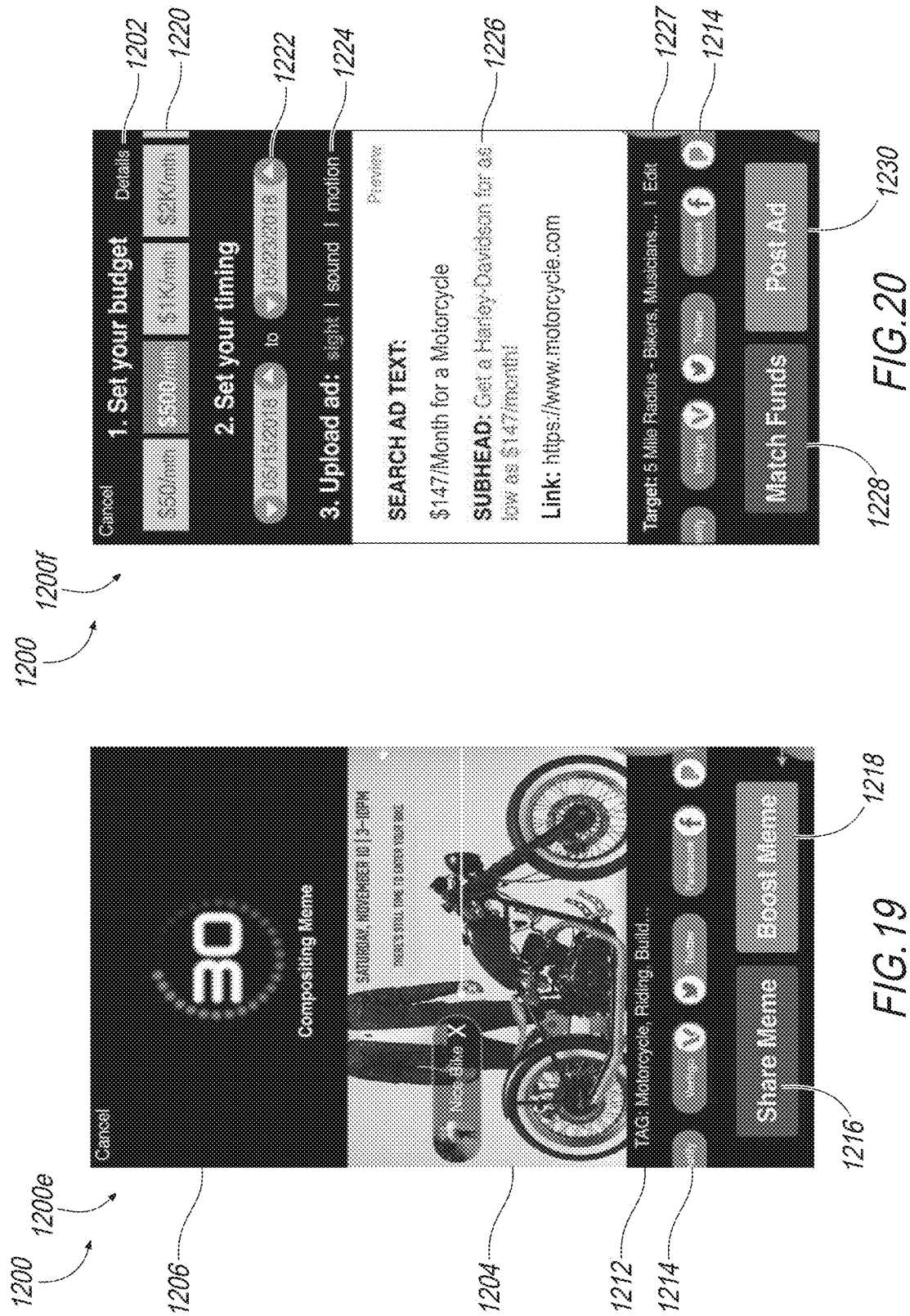

DIGITAL CONTENT CONTROLLER

CROSS-REFERENCE TO RELATED APPLICATIONS

This application is a continuation in part application based on and that claims priority to U.S. patent application Ser. No. 16/262,397 filed on Jan. 30, 2019, which is based on and that claims priority to U.S. patent application Ser. No. 14/384,973 filed on Sep. 12, 2014, now U.S. Pat. No. 10,231,019, which is based on and claims priority to PCT/US13/32216, filed on Mar. 15, 2013, which is based on and claims priority to U.S. Provisional Patent Application No. 61/611,357, filed on Mar. 15, 2012, each of which is hereby incorporated by reference in its entirety.

FIELD OF TECHNOLOGY

This disclosure relates to content control of media content, appropriateness filtering, and content redirect. Among other things, this may include devices, systems and methods for controlling, filtering inbound and outbound media content, and redirecting of targeted desired and undesired media content or portions thereof.

BACKGROUND

The marketing industry continuously shifts in the way media buyers obtain media content, which raise new problems that require creative solutions. The complex and vast networks managed by "programmatic media" exchanges consist of lackluster banner ads that do not effectively interact with social or streamed media content. Traditional systems are riddled with fake viewers called "bots" and inadvertently placed ads among inappropriate content such as pornography, vulgar language or violence. Traditional automation systems have frustrated advertisers and are ignored by target audiences.

Traditional systems are unable to effectively avoid bots, and lack the ability to provide targeted content placement that avoids inappropriate content. Even with media manually placed within hand-picked programming, the sorting and selecting the appropriate environment for particular brands is time consuming and is not tuned to the continuously evolving demands of content viewers. For instance, if consumers complain about a brand sponsoring offensive content, traditional systems require manual removal of that programming from the media plan. And prior attempts have been ineffective at providing a timely response to these issues or the constantly changing demands of consumers. With millions of content channels, the manual changes required by traditional systems are even more problematic.

Further, with social media platforms being built on a "walled garden" philosophy, these platforms require advertisers to negotiate individually for advertising sales. In attempting to avoid these online "advertising exchanges," media companies have created firewalls to prevent marketing automation with advertising inventory. The problem remains that the qualified social media communities and streaming services are not integrated into these systems. As a result, traditional systems still require humans to make intuitive decisions for the more important social media and streaming media channels.

As the demand for and level of digital content continues to expand in our society, our youth continue to be exposed to content by producers that parents do not want their children to see. Unfortunately, the movie and other industries do not police themselves nor do they successfully keep harmful content from minors. The openness of the internet provides the ability of minors to have continuous access to inappropriate content. This continues to be a problem as parents often cannot police the streaming content into their homes due to the lack of advances in digital control technology.

The problem with uncontrolled digital content is not limited to just movies. Digital media covers many aspects of our society and includes not only movies, but also music and video games. None of this digital media employs a common filtering or rating system that can be used by parents or other adults that may wish to preclude inappropriate content from coming into their homes. Search engines and media players also have no way of knowing if the content is appropriate for the value systems of their customers, other than G, PG, R ratings. And even though a movie rating may be provided on some content, such as movies, the movie ratings do not offer enough rating detail for most families nor do they provide any filtering options. Nor do the ratings break down with particularity and inform a user as to what content has caused a rating to be rated R, PG, or other rating.

It is not uncommon for one scene in a movie or one word in a video game to be the only offensive aspect of the media content. The current parental control technology may either block all PG content or none of it. It doesn't allow the user to block part of the content, and it doesn't allow the user to block content for specific offensive content. Current parental control technology blocks entire web sites, even those that offer valuable content for students because of one article or word. They block entire movies or video games because of the rating, when users might not be offended.

It would be desirable to provide improved systems, devices and methods that address these problems. It would be desirable to provide a tool, system and methodology to block specific offensive content such as, but not limited to, nudity and language, without blocking specific content such as violence. Such improved media system should be flexible, selectable and work simultaneously with movies, music, video games, and other electronic mediums and products.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

FIG. 19 illustrates an exemplary user interface for selecting and customizing media content;

FIG. 20 illustrates an exemplary user interface for selecting and customizing media content;

DETAILED DESCRIPTION

Figure 1:
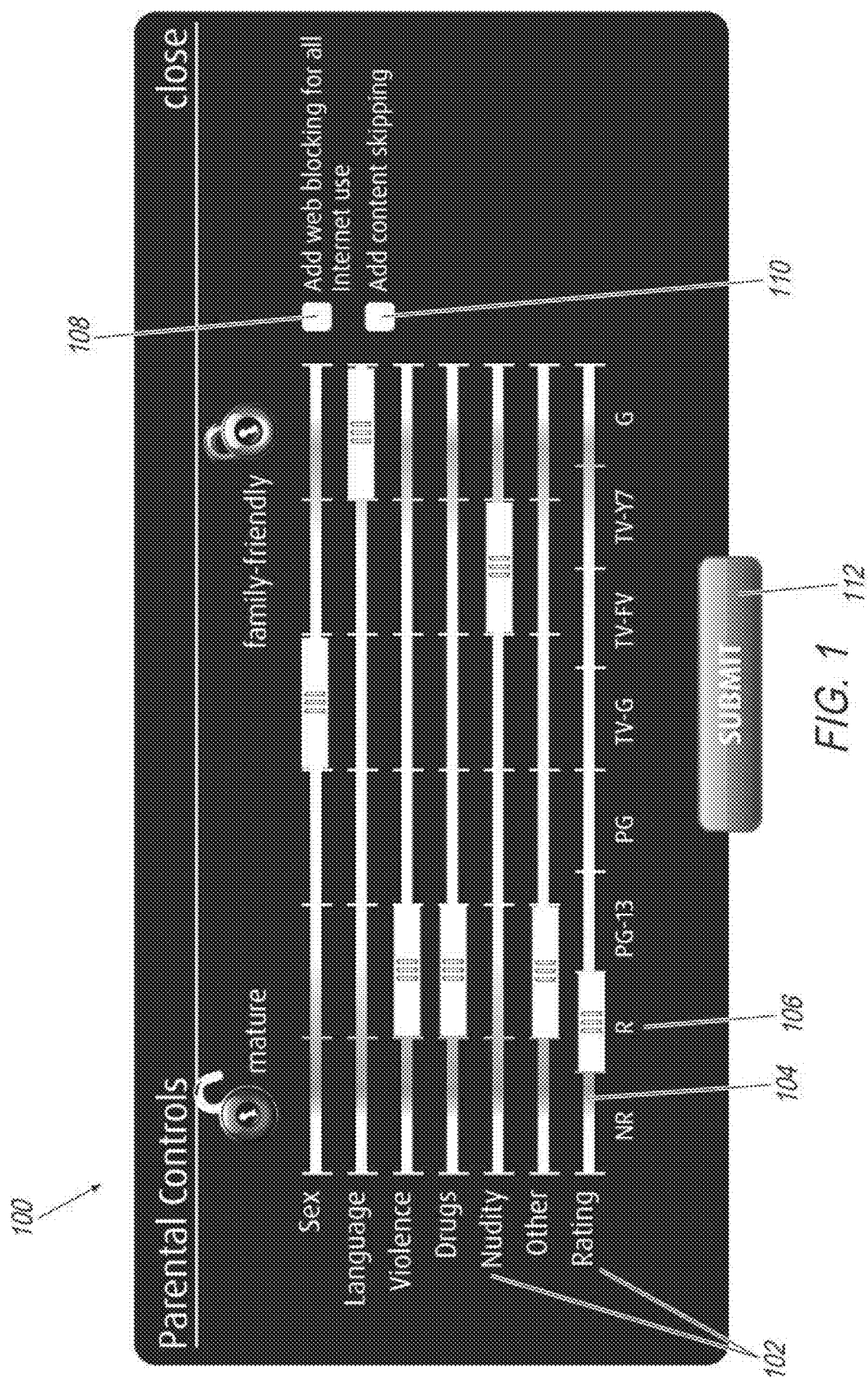
FIG. 1 illustrates a parental controls user interface, showing a scaled slide bar for allowing a person to control media content.

The embodiments here provide improved content selection, distribution, viewing and media intelligence. The systems herein include improved store-by-store media buying, advance reporting for all types of businesses (e.g., quick service restaurants, coffee shops and medical centers), real-time advertising negotiation, and automated and adaptive media content placement. This includes providing an automation platform for posting media content (e.g., advertising media content) in social media, tracking consumer traffic directly back to each individual store. The embodiments herein provide dedicated micro-channels customized to the selections of each user and the associated target audiences.

The systems herein may provide placement control and generated creative content. This allows advertisers to place media content (e.g., advertising media content such as television commercials) in relationship to specific content or types of content defined by the filtering system. The systems herein may generate creative content from a community of users by receiving and aggregating feedback from a plurality of user interfaces.

Embodiments may include an artificial intelligence engine to learn and scale to serve macro and micro-influencers who want to promote their own macro or micro-communities through a user-friendly, web-based portal. While humans monitor the "trading desk," the system automatically places social and streamed media by unleashing a real-time social media posting system.

This user-friendly experience will provide key features that are different from prior attempts in marketing automation. The systems herein provide, for example, content appropriateness filtering and approved content redirect. Content appropriateness filtering allows users can be confident their ads will not be placed in conjunction with inappropriate content. Approved Content redirect includes identifying in appropriate content, searching for an edited version of the inappropriate content (e.g., a family-friendly or brand-friendly version), and placing the media content (e.g., an advertisement) such that it redirects the user to of the edited version of the media content.

Embodiments may utilize real-time bidding systems to access media inventory at the lowest cost as it comes available by the minute, and allows the systems herein to negotiate with one or a plurality of publishers.

The systems herein may be configured to incorporate any and all media channels. Embodiments provide interoperability with third party databases and utilize database exports and imports. The systems herein may unify media sources and employ deep learning to directly associate each specific result to each specific media content posting.

Further, this disclosure provides systems that are configured to be "aware" of which media content posts and channels deliver the best results, and at the lowest cost. The systems herein track, aggregate and adapt media content according to the individual ages, gender, purchasing patterns and even the location of each user in real-time (e.g., via location position systems such as a global position system (GPS)). The system allows for continuous performance improvements relative to user selections and goals. The systems herein may integrate media content information from one or more databases, generate customized media content, and adapt the media content based on audience responses.

The systems herein employ a comprehensive advertising appropriateness filter. This may include filtering of received, inbound, background and/or surrounding media content, filtering of transmitted, outbound, targeted, and/or advertising media content, or any combination thereof. This may include monitoring selected or all content online, aggregating this content in a universal database, triaging and flagging the media content and media content portions according appropriate and inappropriate content, and associating alphabetic, numeric and/or alphanumeric ratings for objectionable content, e.g., in the categories of sex, language, violence, drugs, nudity, media rating systems and other inappropriate elements. Leveraging this intelligence, systems may receive user selections and automatically place and adapt targeted content according to user selections.

Embodiments may include a content controller system that allows the user to set media selection based on parameters that meet family values on categories including, for example, violence, sex and vulgarity. Media Content is given a numeric ranking (e.g., 1 to 5) based on various categories such as sex, language and violence. The user may reduce or increase their media library based on their parental control settings.

The systems herein may categorize and register media content according to the rating of the edited content. For example, if a user selects a move that was originally R rated but the movie has been edited for PG (e.g., a made for TV or airline version), the system may categorize, register and display the movie as PG. This applies for movies that are both manually or digitally edited for content.

Embodiments may include or be in communication with one or a plurality of databases of media content. The media content may have ratings (e.g., numeric) on sex, language, violence, drugs, nudity and other potentially offensive content. Ratings may come from users, managers and third-party organizations. For example, an exemplary rating system may including rating from 1 to 5 for each category. Systems may include a media manager configured to search and filter content for user viewing or playback using the operations herein.

An exemplary embodiment of a media content and parental controls system has an improved interface and provides a numeric rating to every media element in its content database for categories including, but not limited to, sex, language, violence, drugs, nudity and other parameters. The system may allow a user to set parental controls on each of these parameters. The system will automatically block all content that includes this content or removes the offensive elements from the content, so the user can experience media without offensive content.

Another embodiment provides a system that allows the user to have a single media player that can search and access digital movies, music, news and video games, blocking inappropriate content or even skipping inappropriate elements within the content.

Another embodiment of the system allows a user to be able to block specific offensive content such as nudity without blocking specific content such as violence. This media system will simultaneously work with movies, music, video games, and other content.

Another embodiment provides a media manager with a search engine and media player, wherein the search engine is improved to include the If-Then parameters of the parental controls system according to the user settings. The media player is modified with the ability to read and act on a timeline-based edit list with all potentially offensive material marked with "in" and "out" points on the timeline. The player is modified to replace the offensive content with transition content or no content that would offer a safe user experience without too much disruption to the consumption media.

FIG. 1 depicts an exemplary screen shot of a parental controls user interface 100 that could be accessed via the internet page of a main user interface 200. User interface 100 may include a user interface device having a hardware display, a hardware processor and physical memory configured to respectively display, execute and store the operations herein. This is the user interface a parent, guardian, or other may use which provides the ability to edit a filter for preferred search results. The parental controls user interface 100 is provided with a list of the multiple rating categories with a range from low to high, which could correlate to a mature to family-friendly scale. The rating filter can be used by many people including a parent, or for a linked user like a child, in order to establish different allowed results. The interface 100 includes rating categories 102 such as sex, language, violence, drugs, nudity, and others. A rating bar 104 is provided which can correlate to rating categories 106 such a NR, R, PG-13, PG, TVG and more.

The user interface 100 also includes an add web blocking for all internet use tab 108, add ClearPlay to skip sex, vulgarity and violence on all of your DVD's tab 110, and a submit tab 112. The add web blocking tab 108 activates the system to use the filter on the content that is streaming from the internet. The add ClearPlay tab 108 permits a user to apply the desired filter on DVD products. Thus, the system 10 can be used to filter media content from multiple sources. It will be appreciated that the interface 100 may have other tabs and features.

Figure 2:
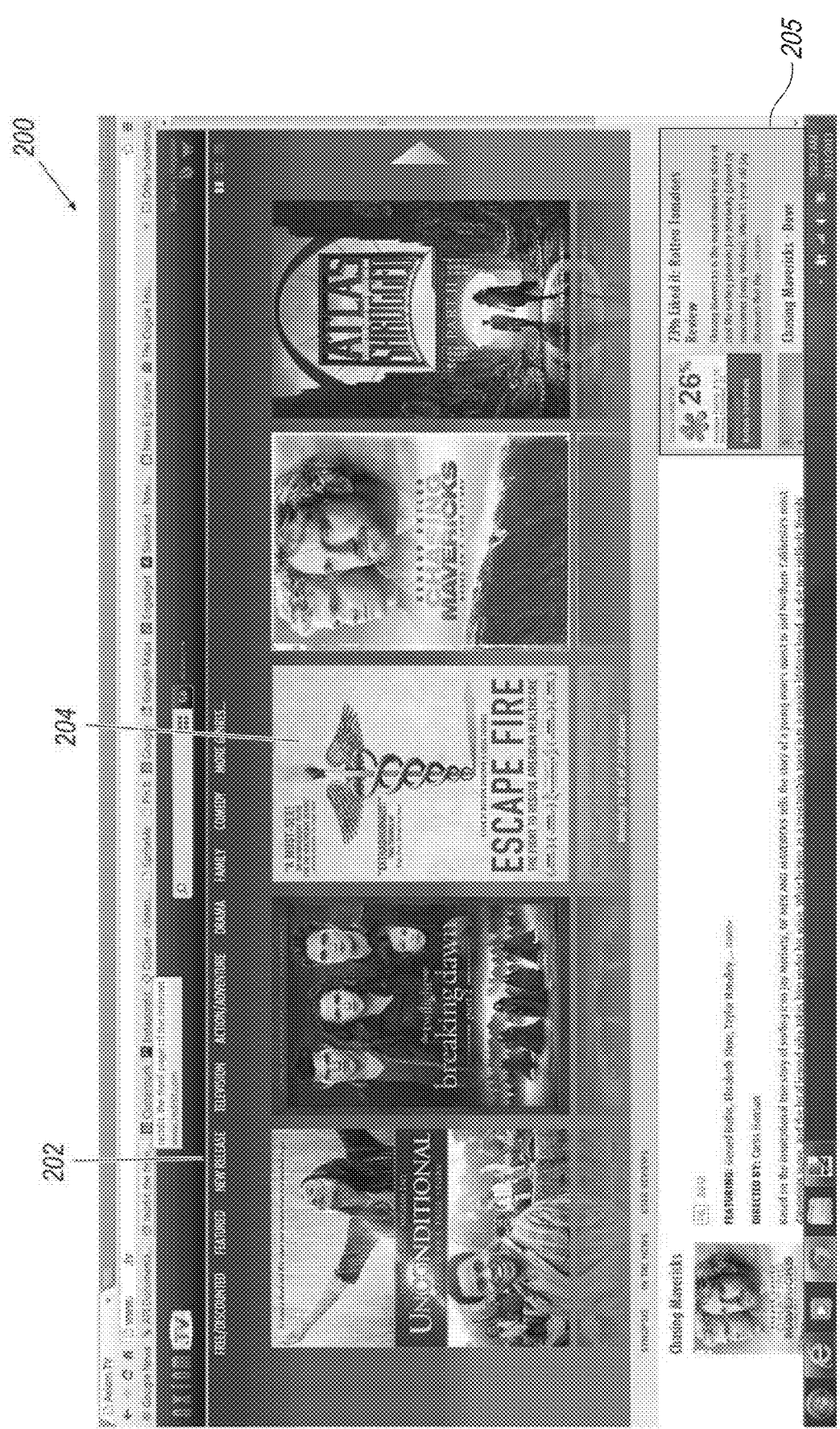
FIG. 2 illustrates a main user interface, showing what a user sees when logging into the Axiom TV web site.
Figure 11:
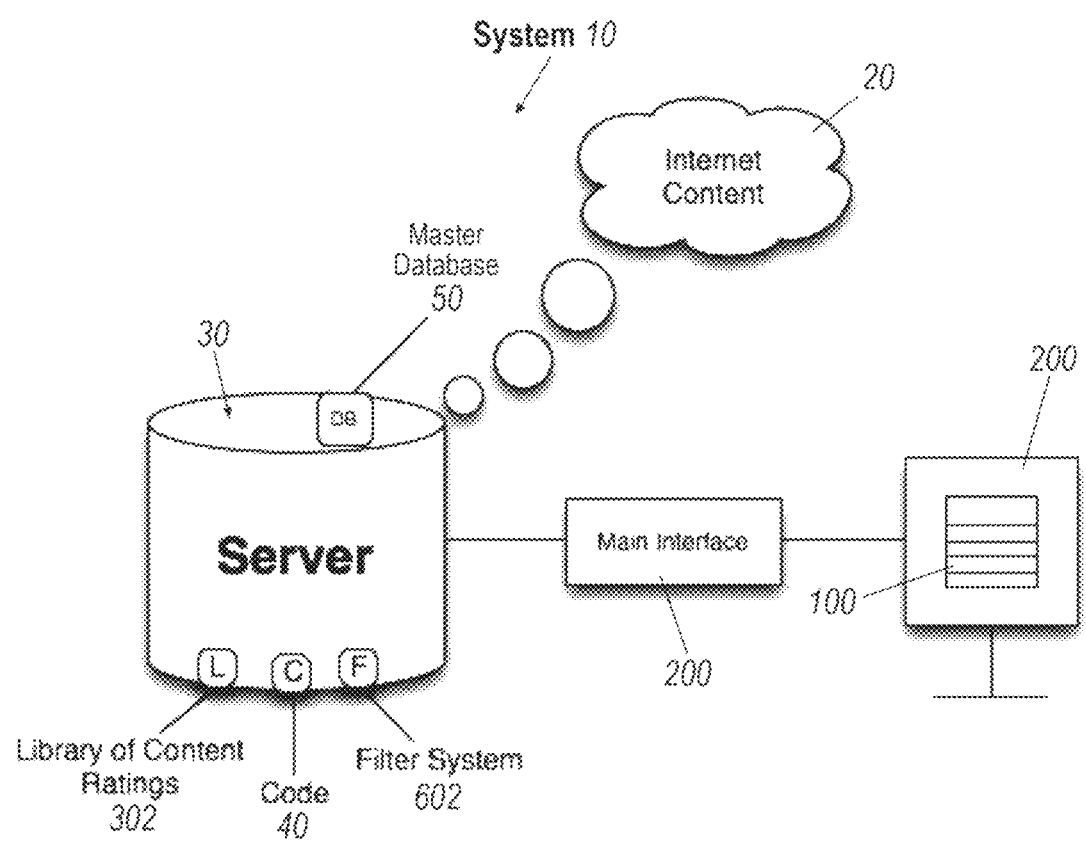
FIG. 11 illustrates a system including a network based platform to provide user interfaces of the present disclosure.

FIG. 2 depicts a main user interface 200 that is accessed via the internet by a user. This allows the system 10 to be accessed remotely and from anywhere as long as the internet 20 is available. The main user interface 200 can be on a network based platform and is the primary interface consumers drive through to access the system 10. See FIG. 11. A server 30 has a CPU and memory and hosts the program 40 which drives the system 10. The interface 200 includes categories 202 (FIG. 2) of content such as new releases, drama, family, and others, for the consumer to choose from. Thus, a library 204 of media content can be built within the system 10 and saved on the server 30 or accessed via the internet 20. Media content may include advertising media content 205.

Figure 3:
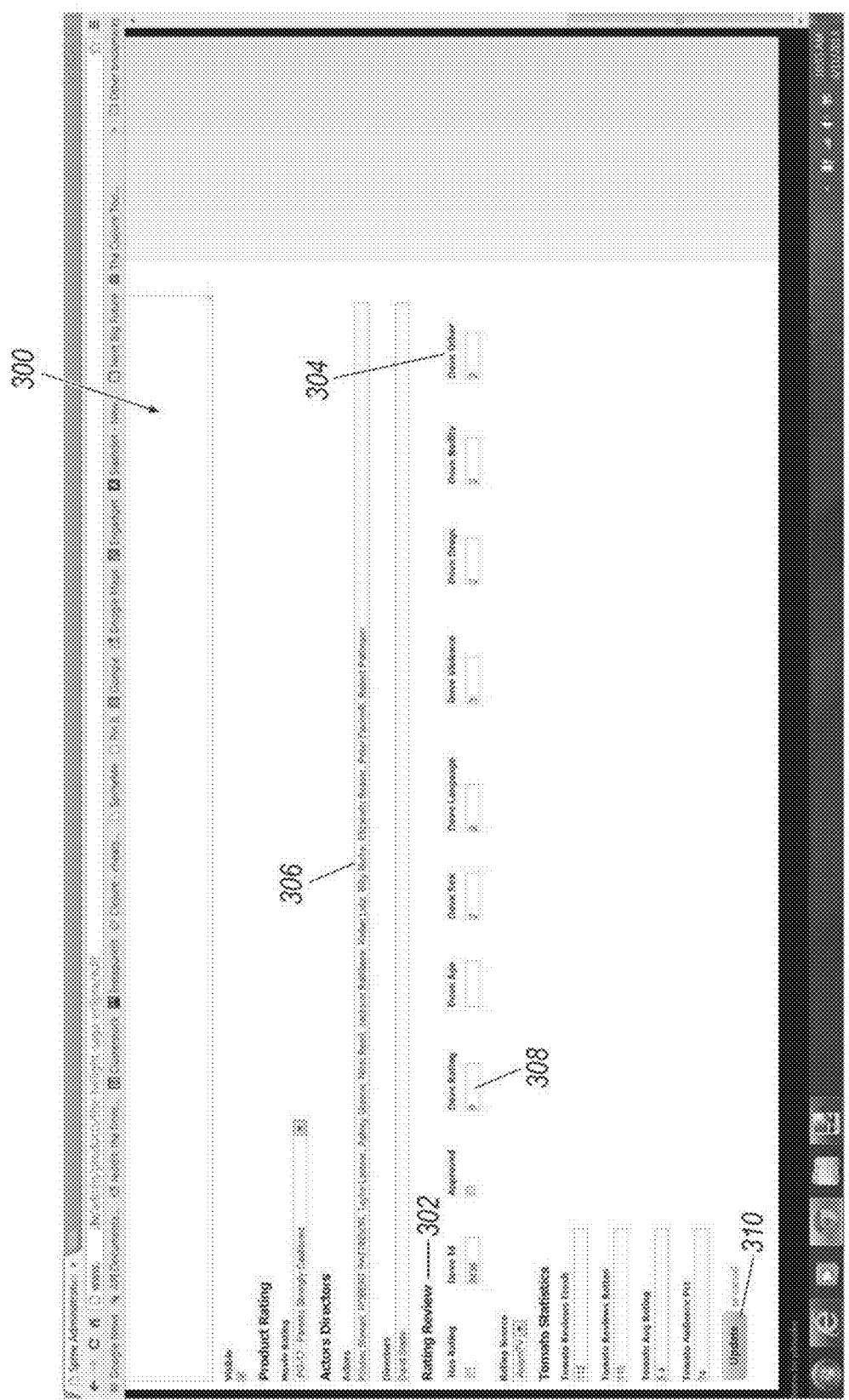
FIG. 3 illustrates a screen shot of an administrative ratings user interface.

FIG. 3 illustrates a screen shot for the administrative ratings user interface 300. This is one of the screens a manager of the system 10 can access in order to help build a library of content ratings 302. See FIG. 11. This process could be done automatically by the system 10 by pulling the information from other sources and propagating the fields 308 that are seen in the interface 300. The library 302 may collect ratings from an existing provider 304 and build the library from pre-existing information. A manager of the system 10 may input other data 306 such as actor information, directors, movie rating, and more. Once the manager has propagated the fields 308, a submit button 310 is pressed to save the information to the server 30.

Figure 4:
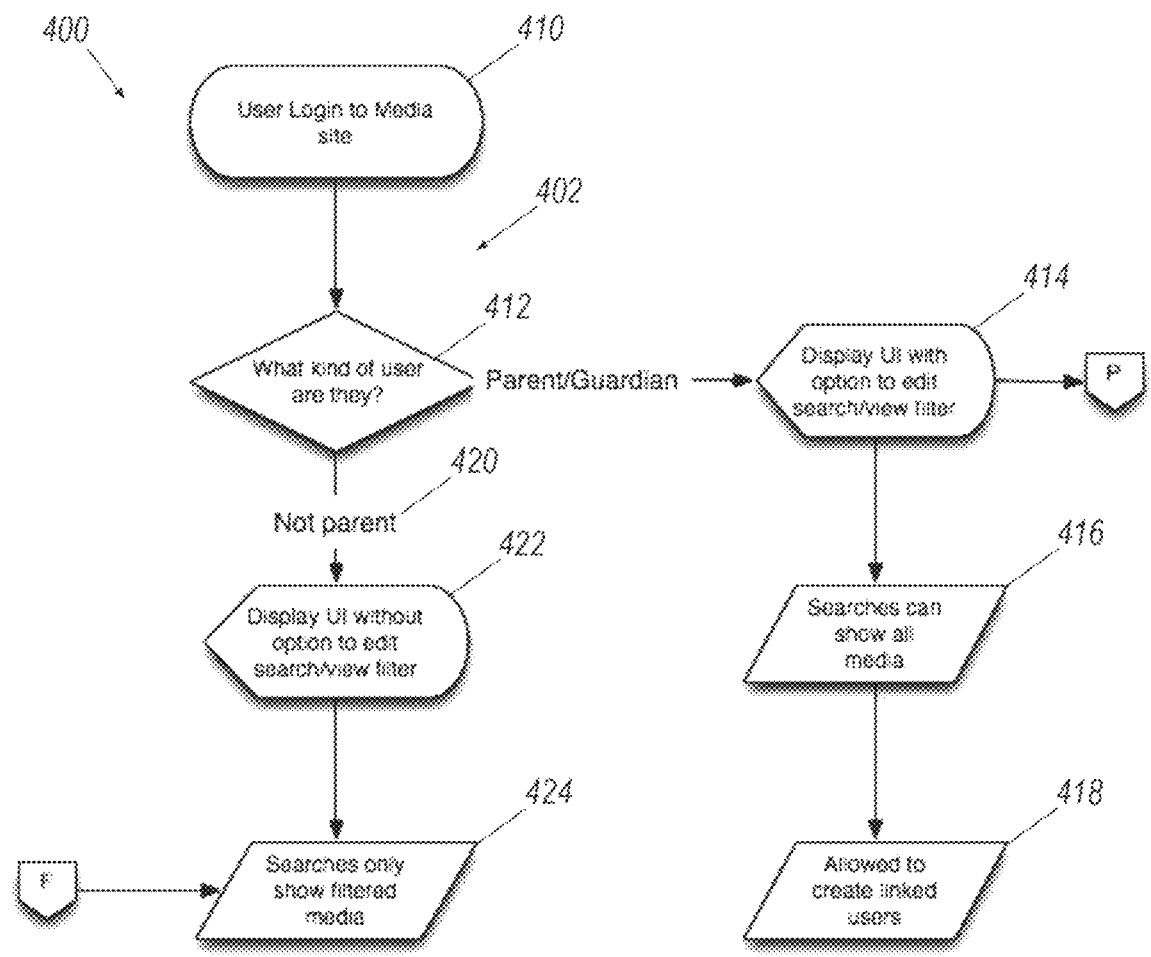
FIG. 4 illustrates a logic diagram of how the media manager module operates.

FIG. 4 illustrates a media manager module 400 and the algorithm or flow chart 402 that drives the decision making for this module. The media manager module 400 is a routine of the computer program 40 that operates on the server 30. The media manager 400 is accessed by entering through the main user interface 200 (FIG. 2). To access the media manager 400, the user logs into the site 410, and as part of the login process, the system 10 searches to see what kind of a user they are 412. If they are a parent or guardian, they are given an icon with an option to edit 414 the parental control settings for themselves, and for any users they are linked to. The user can search to show all media 416 that passes through the filter. All displays of movies consist of a search (either the default search, or some typed in keywords) will only display results which fall within the parameters of the parental control setting. If a user is a parent or guardian, they are allowed to create user profiles for linked users 418. If a user is not a parent or guardian, they can't modify the search parental control filters, nor create linked users.

If the person that logs in is not a parent 420, the system 10 will display a user interface without the option to edit a search or to view the filter 422. Under this method, the result of any searches will only show filtered media 424.

The media manager module 400 provides a system of searching and sorting media so that the user will find content throughout the digital universe. If content has a rating, the user will have access to the content, based on parental controls settings. If the content has no rating, the user will only have access if the ability to view non-rated content option is selected by the user.

The media manager module 400 acts as an optional search engine tool that allows the user to search for video, audio, text, images and interactive software ("Content") using the Web, media appliance (TV, radio), mobile devices or other digital technology. The media manager and search engine could adopt and add the rating and filtering system to its function. A video editor feature is optional and presents a feature for editing content and delivering cleaned content, on demand. Content can be acquired from distributors with edits (made for TV or airline versions), and content can be edited by third-party content providers.

Figure 5:
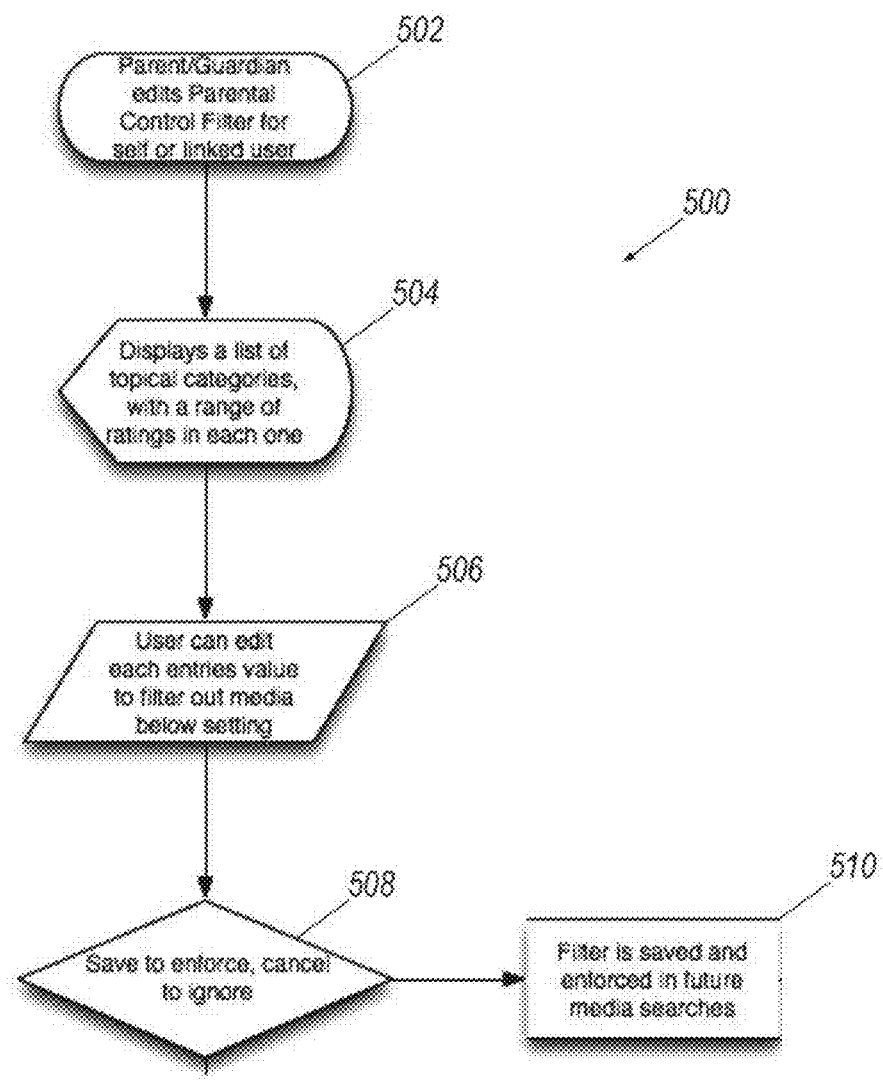
FIG. 5 illustrates a logic diagram of how the parental control user interface operates.

FIG. 5 illustrates a logic diagram 500 of the operation of the parental control user interface 100. The parental controls user interface 100 is depicted in FIG. 1 and is the feature that allows the user to manually set parameters of what he/she wants to have access to within his/her family or community. The user can set a numeric value to sex, language, violence, drugs, nudity or other potentially offensive content. The interface 100 becomes the input to a rating system that could be used with other search engines or media managers that already exist if the parental controls are applied with or without a user interface.

The logic diagram 500 for the parental control user interface includes the exemplary step of providing a parent editing a filter 502, displaying a list of topical categories, with a range of ratings in each one 504, allowing the user to edit each entries value to filter out media below the setting 506, saving to enforce, cancel or ignore the setting 508, and if saved is selected, then saving to the system the filter to enforce in future media searches 510. It will be appreciated that this algorithm can be modified to enhance performance of the system 10.

Figure 6:
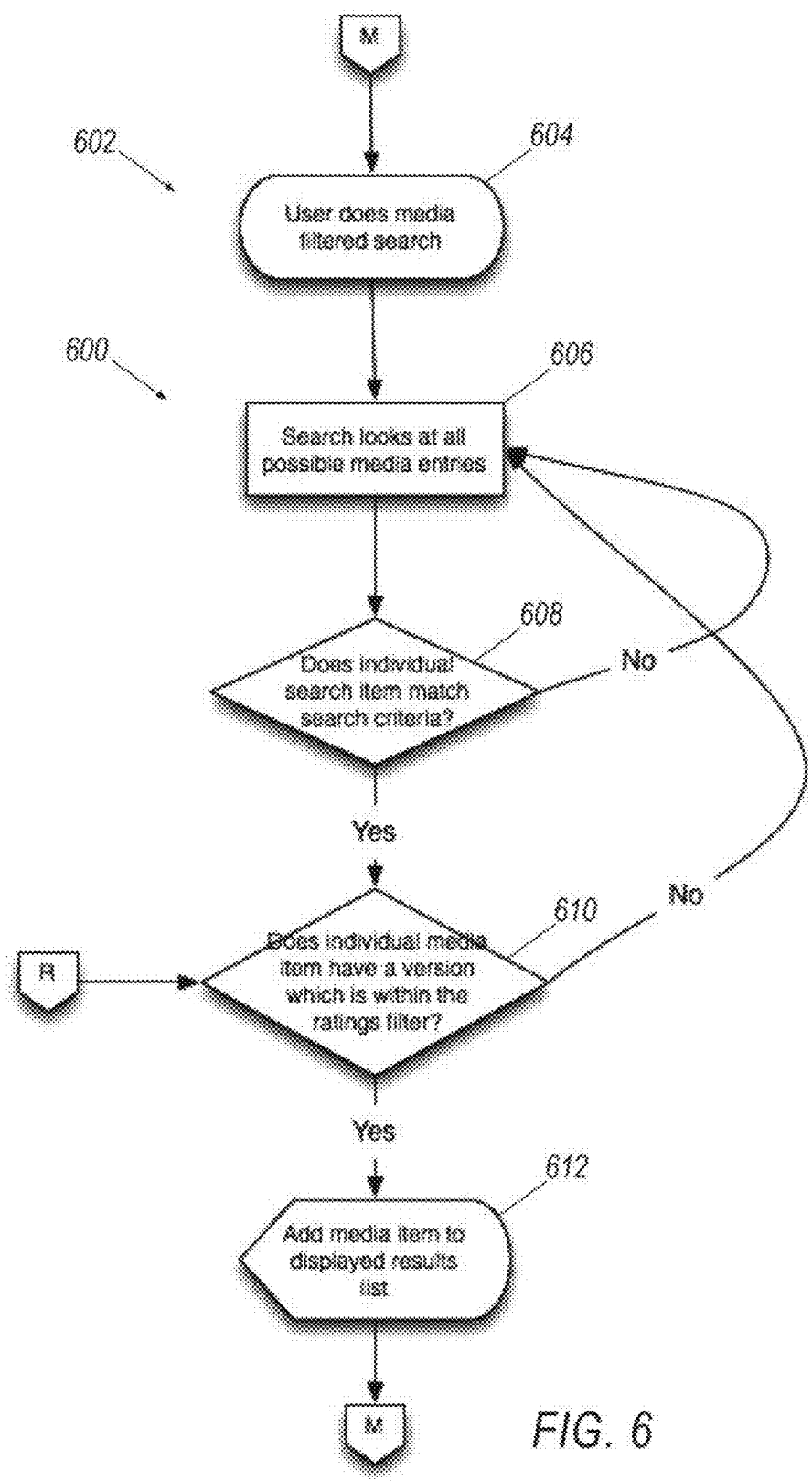
FIG. 6 illustrates a logic diagram of how the filtering system operates to extract undesirable content.
Figure 7:
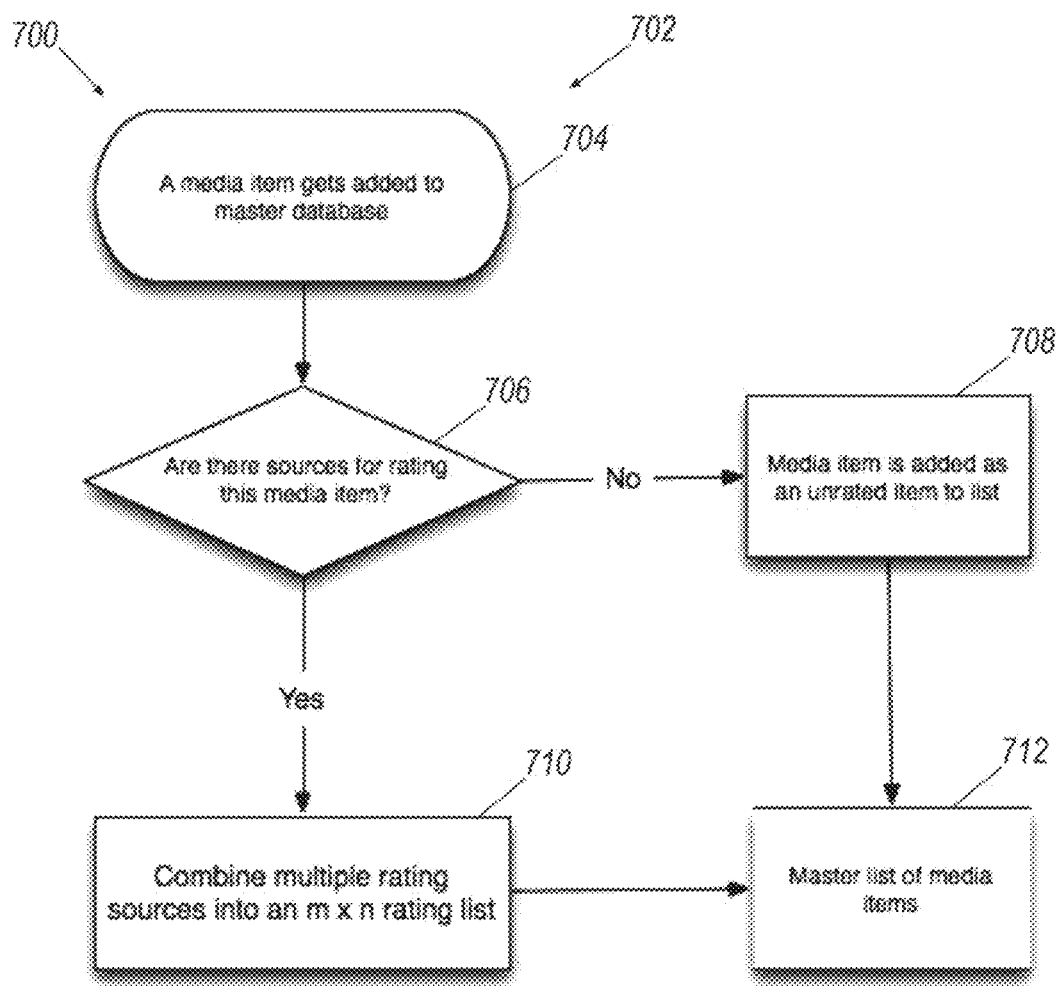
FIG. 7 illustrates a logic diagram of how the rating system operates.

FIG. 6. Illustrates a logic diagram 600 that is a module within the code 40 that is stored on the server 30, or even in the cloud. This logic forms the filtering system 602 and sets out the process of filtering content. This is the logic behind the scenes that interfaces with the inputs by a consumer at interface 100. Any searching by a user of the media database will use the associated rating filter system 600 to constrain the results. The setting on a particular category will limit any subsequent search to be lower or equal to the rating that the specified filter. Setting the filter to the highest settings will allow all media entries to be displayed.

The filter system 602 includes the following process steps. First it starts with the user does a media filtered search 604. Then the search looks at all possible media entries 606. Next it asks does individual search item match search criteria 608. If not, the process goes back to step 606. If yes, the process advances to determining does the individual media item have a version which is within the ratings filter 610. If no, the process reverts to step 606. If yes, the process adds media item to displayed results list 612.

The filtering system 602 compares the user settings from the parental controls user interface 100 with the rating system 702 for the content. If the numeric value of the content is within the parameters of what the user wants to allow, the content will be accessible to the user. If the numeric value of the content is within the parameters allowed by the user, the content will be accessible to the user in part or in whole, based on the user settings.

The rating system logic diagram 700 includes the step of a media item gets added 704 to the master database 50. Next decision of are these sources for rating this media item is asked 706. If the answer is no, the media item is added as an unrated item to a list 708. If the answer to the question "are these sources for rating this media item" is yes, the rating system combines multiple rating sources into a rating list 710. Thereafter a master list of media is updated 712.

The rating system 702 provides for all media entities loaded into the master database 50 (see FIG. 11) can have a rating assigned to it. If a media entity doesn't have one, it is unrated, which is treated as the highest possible rating. When a media entry is added to the database, ratings can be assigned to it both programmatically (from external rating sources like MPAA, IMDB, and Dove) and edited and reviewed by a system administrator editor. The ratings are organized into multiple categories (like sex, violence, drugs, etc.) that can range from low to high.

The rating system 702 is maintained in the database associated with all content presented to the user. The rating system 702 includes all public rating systems such as the MPAA, TV and video game ratings as well as a custom database for each of the parameters set in the parental controls user interface. Other database sharing is used from sources such as the Dove Foundation as well as manually entered ratings from users and technology developers as well as artificial intelligence to detect offensive content in order to get complete content ratings.

The rating system 702 provides the data to the filtering system 602 so that the parental controls settings can be applied to give access or denial to part of the content or all of the Content. The rating system 702 is helpful because without a common rating system on each parameter of sex, language, violence, drugs, nudity or other, the system would have no basis of filtering. This rating system is applied to the content as a whole. This rating is also applied to individual chunks of content as well. Without filtering the rating system 702 will not block content for the user.

Figure 8:
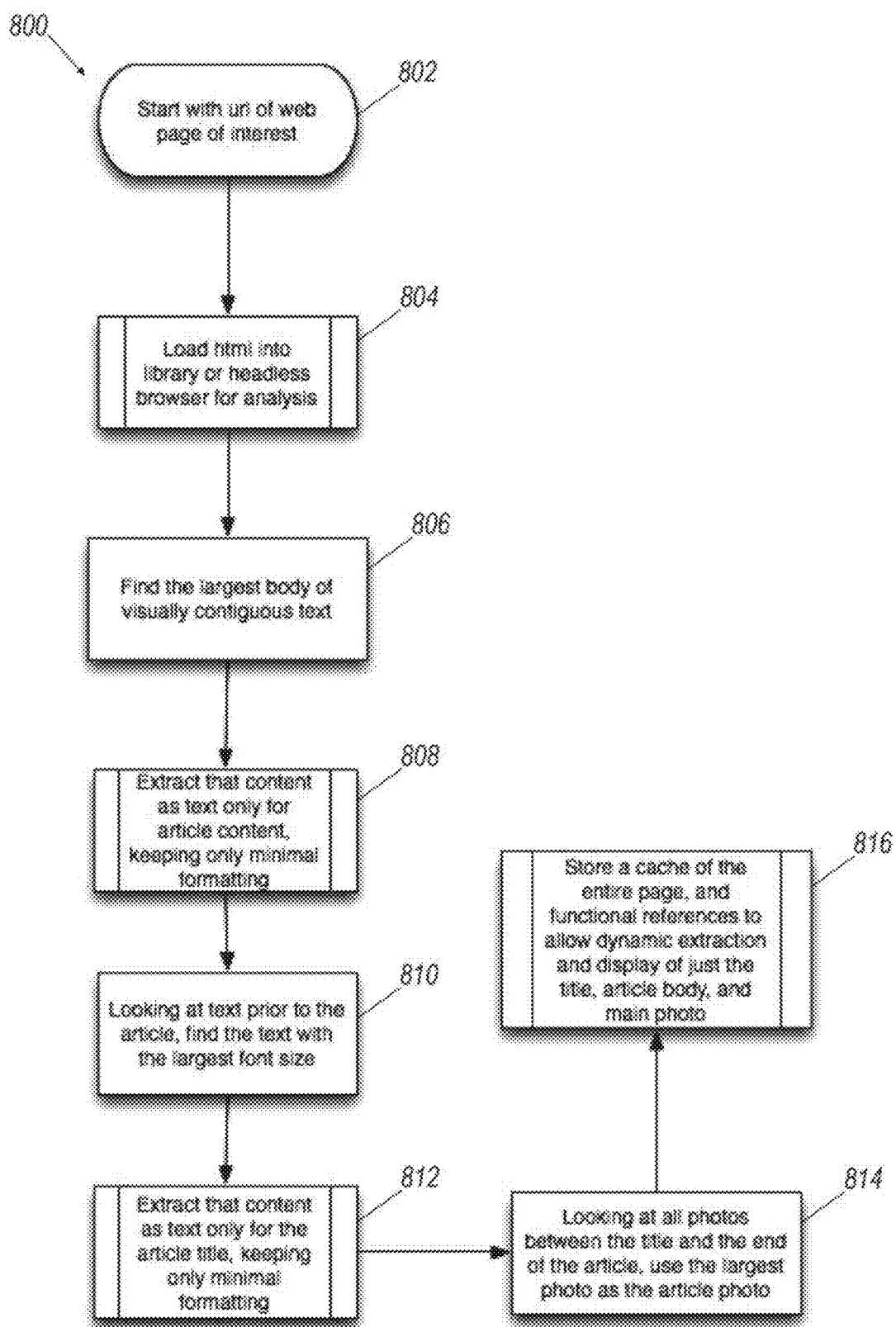
FIG. 8 illustrates a logic diagram for a mobile content extraction routine module.

FIG. 8 illustrates a logic diagram 800 for another module of the system called a mobile content extraction routine 802. The function of this module or routine is to take the essence of a web page article 900 (see sample at FIG. 9), and display only the most salient pieces of information with a consistent user interface for better readability and faster article navigation (see 950 sample at FIG. 10). The most salient pieces of information are the article title, its textual content, and one article photo if there is one. The extraction is performed on a given web page url of interest. A headless browser and/or html analysis library is used to be able to programmatically view and analyze the page. The main body of the article is obtained by finding the largest body of visually contiguous text on the page. Standard library routines are used to find and extract textual only contents plus minimal formatting like bold and italics. Text is considered visually contiguous if they are next to each other in the page display without separation by too much space (an experimentally obtained parameter) or any borders. Next, the title is obtained by finding the text element above the article that has the largest font size. Finally the article photo is obtained (if there is one) by grabbing the largest photo anywhere in the html between the title and the end of the article body. The entire page is stored in the database, along with functional extraction references to the previous pieces. The purpose of that being to be a better article viewer of articles, and not store an edited version of the article which have copyright issues.

With continued reference to FIG. 8, the logic diagram 800 starts with a URL of a web page of interest 802. Next html is loaded into a library of headless browser for analysis 804. Next the system finds the largest body of visually contiguous text 806. Then it extracts that content as text only for article content, keeping only minimal formatting 808. Next it looks at the text prior to the article, and finds the text with the largest font size 810. Then it extracts that content as text only for the article title, keeping only minimal formatting 812. Next it looks at all photos between the title and the end of the article, and uses the largest photo as the article photo 814. And finally, the system 10 stores a cache of the entire page, functional references to allow dynamic extraction and display of just the title, article body, and main photo 814.

Figure 9:
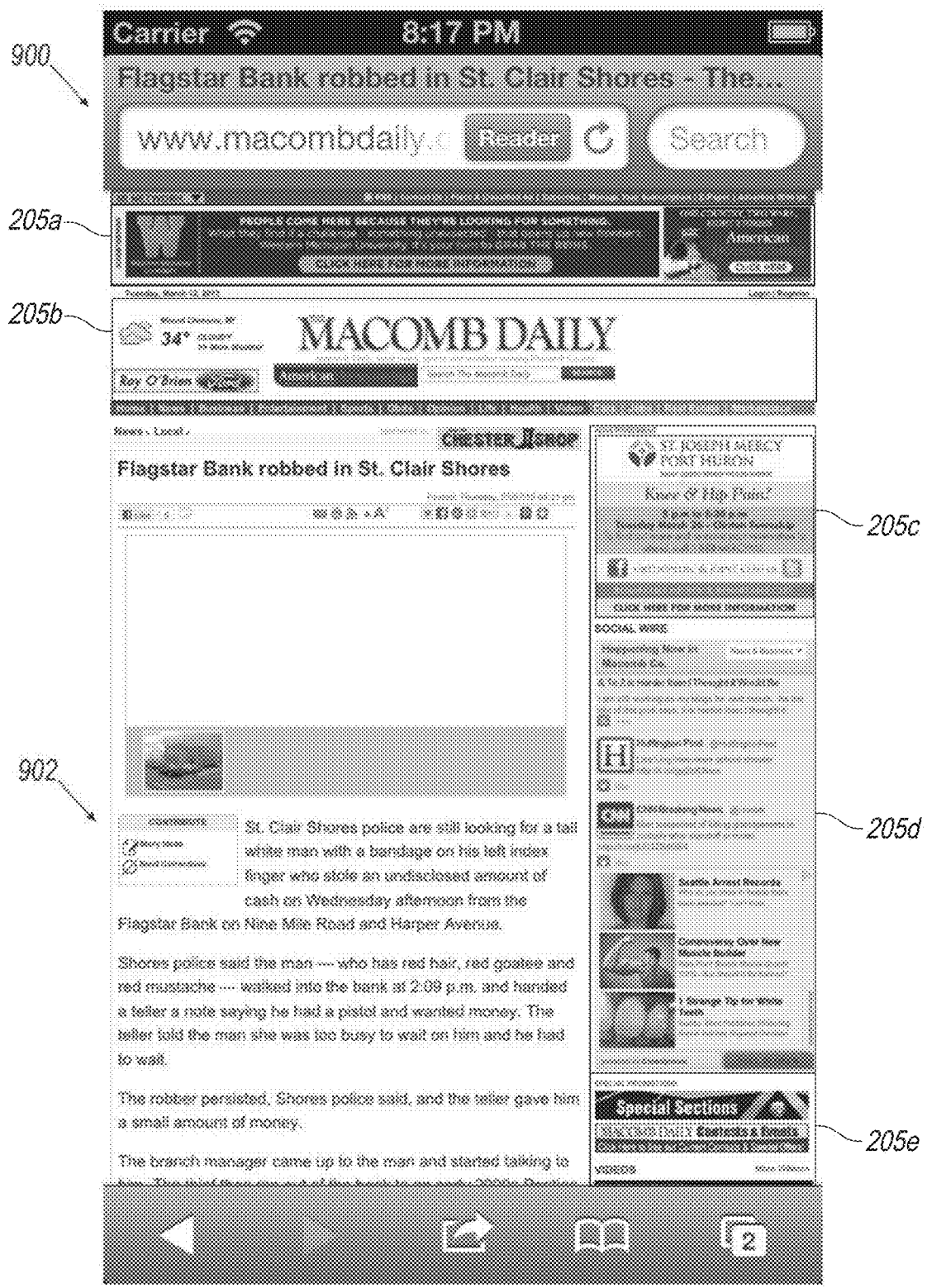
FIG. 9 illustrates a representative screen shot of a web site showing content that has not been extracted.
Figure 10:
FIG. 10 illustrates a screen shot of the FIG. 9 web site after the content has been extracted using the FIG. 8 logic, but now showing preferred content.

FIG. 9 illustrates a representative screen shot 900 of a web site showing content that has not been extracted. The extraction process 802 as shown in FIG. 8 is implemented which results in a scrubbed or cleaned web page. FIG. 9 shows a web site 950 after it has been scrubbed 952. The preferred content is now shown.

Any or all of the above components of the disclosure may work individually or together to perform a unique function for an integrated media system with multi-function parental controls (e.g., both on the content and within the content itself). If the user searches for media content including but not limited to video, music, text, images or interactive software, the system may find all possible matches, but not make any visible yet to the consumer. If content has no rating and user has parental controls are off, the system may give the user access to content and make it visible. If the user has parental controls turned on, the system may filter content, e.g., blocking all non-rated content first. If the content has a rating, the system may filter content according to user settings. If the user has a setting to block content rated 3 or higher for a particular offensive element (such as nudity) and content contains material with a rating of 4 for the same offensive category, the system may block the content.

If the content is segmented into rated content chunks, the system may only block the chunks of content that are offensive, allowing other content to become accessible and visible. For example, if one scene in a video game presents a nude woman and if the user has settings to block all nudity, only that scene would be removed from the game. However, if the content is not segmented into rated content chunks, block the content in its entirety. If filtering is complete, the system makes visible and available to the user any content that passes the parental controls filters, and blocks all other content from any access.

The above steps and system 10 may be modified and yet remain within the spirit of the embodiments shown. The present system is a digital application which is developed to create a search engine which operates on an internet-based platform. It could use, but is not limited to, use of a combination of HTML and Javascript database technology, with web servers and high bandwidth Internet. The search engine is able to proactively crawl the Web and create a database that is responsive to users when they come to search for media they want to consume. However, the exemplary search engine will include a highly filtered and user managed database of media that will be ranked and rated on parameters for parental controls. The system 10 will allow users and system managers to input ratings on the content database.

For example, a movie such as "Facing the Giants" is rated with 5 stars from the Dove Foundation. The Dove Foundation gave this movie a "0" rating for sex, drugs, nudity and other, but it got a "1" rating for language and violence. The search engine is operable to pick up this rating from the Dove Foundation and store the rating for this movie in a database. Under this scenario, the filter should only show "Facing the Giants" as a search result if the user sets parental controls at a "1" or higher for language and violence. Thus, the system 10 is flexible in that it lets the user to specifically set parental control ratings for different categories, search the web for content that meets that criteria, and allow the acceptable content to pass through the filter to a consumer.

The system 10 also provides a video editor that can customize video according to user preferences. In the case of "Facing the Giants," the users will be given the option to edit the movie for their personal consumption. They will be given the option to create a mark in and out points for each of the offensive language instances or violent scenes. The edited versions will be resubmitted to a source for rating. After rating with edits, the source will provide back an "edited" version of the ratings. If the "edited" rating for "Facing the Giants" gives it "Os" on all parameters, all users will have access to it. When the user plays this content with parental controls all set at "0," the edit list from the user who created it will be downloaded with the full movie, and the playback works according to the user edits.

A method of operation will now be described. It will be appreciated that this is but one exemplary embodiment and that other are contemplated. First, a user would access the Media Manager through a media device such as a TV set device, a mobile device, a PC or other digital system. The user would set up the parental controls user interface settings by selecting a numeric value for sex, language, violence, drugs, nudity and other individual settings.

Next, the user would search for media. The media manager will only present media that can be experienced without any of the inappropriate content blocked within the parental controls user interface. The user will play, read, view or otherwise experience the media that has been filtered or edited by the media manager. Seamless to the user, the system will allow the user to experience content without seeing any content defined as offensive by the user. In some cases the content will be blocked in its entirety, but in others the system will edit or present an edited version of the content in such a way to remove offensive material from content that previously had offensive material in its original state.

Additionally, the user will have the option to rate or edit content for the greater community of users. For example, the user will be given the option to upload and submit a rating or apply for a rating from the community or from an approved third-party rating system for content provided by the user.

The user will also be given the opportunity to mark specific chunks of content as inappropriate based on a numeric value on sex, language, violence, drugs, nudity or other parameters to be set by the user. The user will be given the ability to edit the content and share their edits with the community. The edited content will be submitted to be rated as new content for the filtering system. The user will have the ability to share ratings, parental control settings and edited material with social media and within the media manager user community. Additionally, this rating system and parental control technology could be used as an improvement on a search engine or media player of any kind.

The system 10 could produce a rating database for content. The system 10 could also produce an edit list or a library of content that has been edited for inappropriate material. The system 10 could also produce a search engine technology that is superior to others in getting personalized results. The system 10 could produce media content.

Figure 12:
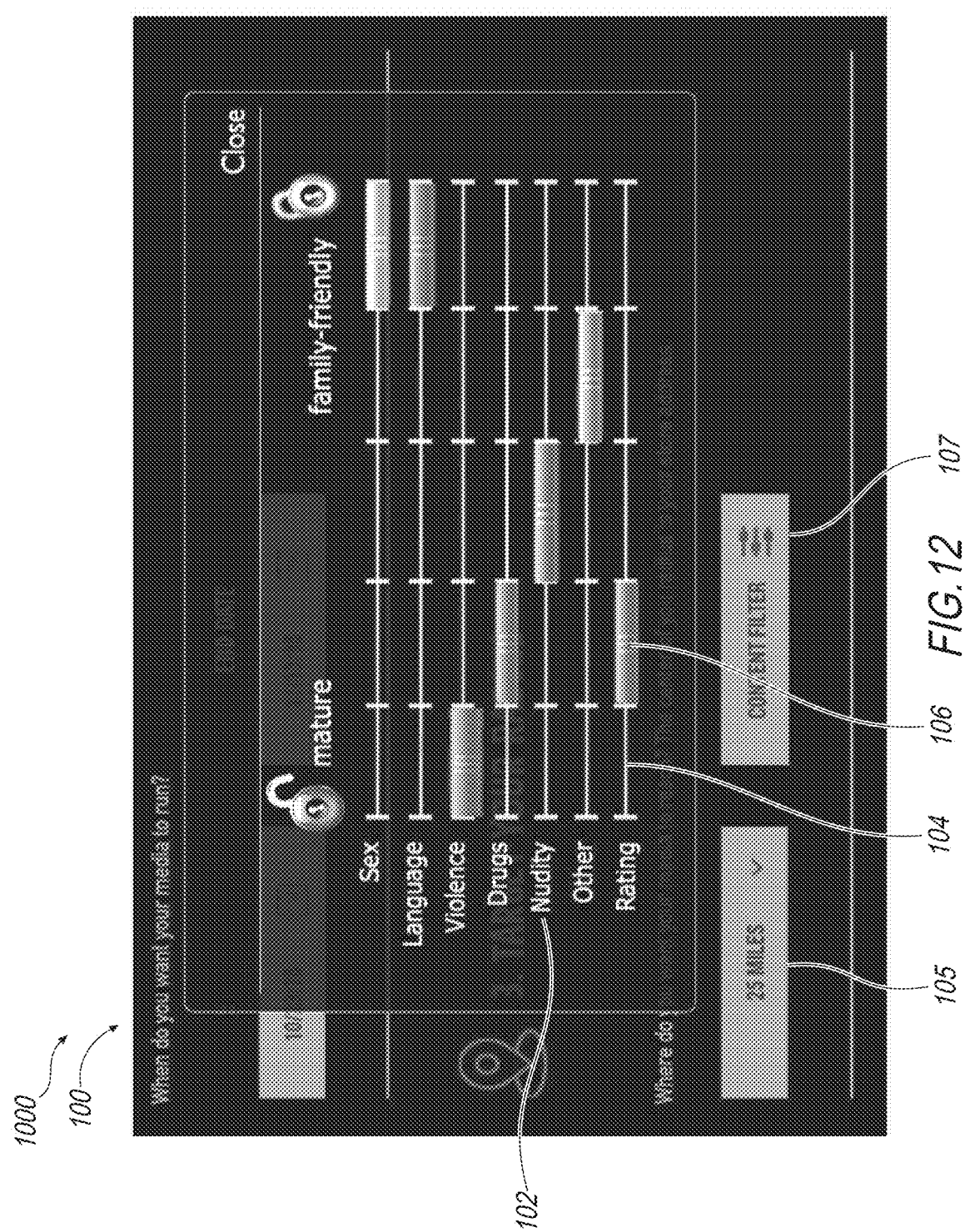
FIG. 12 illustrates an exemplary user interface of the present disclosure.

FIG. 12 illustrates system 1000 including, for example, user interface 100. System 1000 may include rating categories 102 such as sex, language, violence, drugs, nudity, and others. System 1000 may include rating bar 104 that correlates to rating categories 106 spanning between mature and family-friendly including, for example, NR, R, PG-13, PG, TVG and more. System 1000 may include geolocation filtering 105 and content filtering 107.

Figure 13:
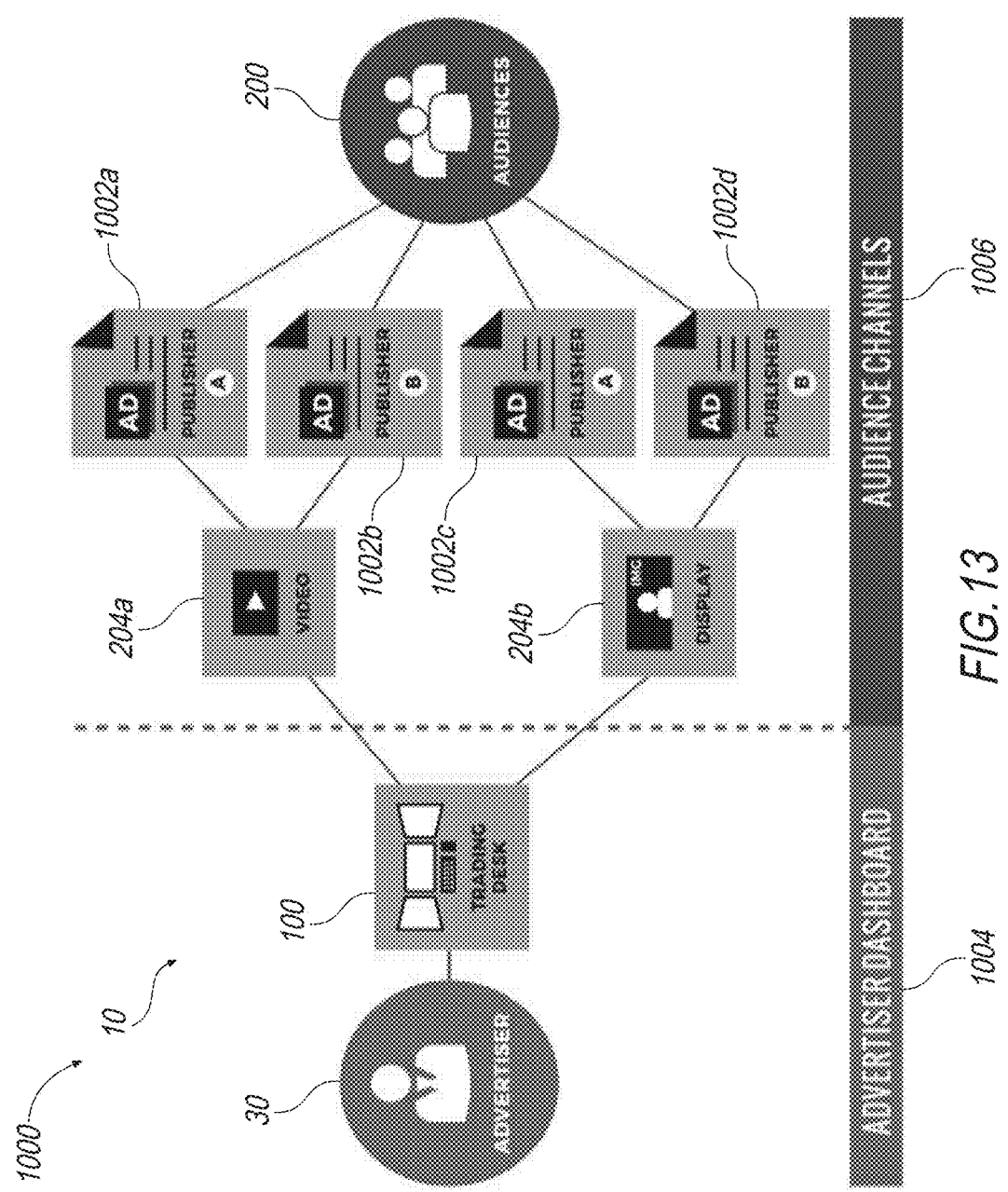
FIG. 13 illustrates an exemplary hardware system of the present disclosure.

FIG. 13 illustrates system 1000 including, for example, system 10. System 1000 may include an advertiser dashboard 104 including server 30, and user interface 100 (e.g., user interface devices with a hardware display, hardware processor and physical memory). System 100 may include audience channels 1006 including media content libraries 204a-b (e.g., database or memory), media instances 102a-d (e.g., advertising media content), and one or more user interface 200 (e.g., user interface device with a hardware display, hardware processor and physical memory). User interface 200 may be configured as a trading desk, advertiser, media buyer or administrator interface. User interface 300 may be configured as an audience, customer, viewer or end user interface.

Figure 14:
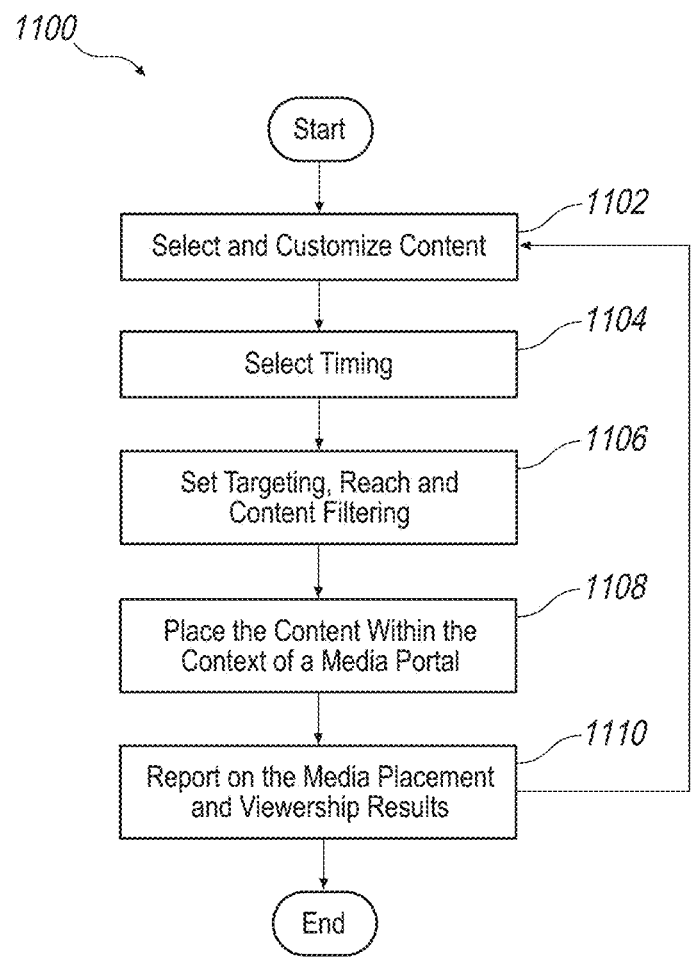
FIG. 14 illustrates an exemplary process for automated placement of media content.

FIG. 14 illustrates process 1100 for automated placement of media content. Process 1100 may include any operation herein, which may executed be by a hardware processor, stored on physical memory or a database, and displayed by a hardware display of any system, user interface or server herein or a combination thereof.

At block 1102, user interface 100 may select and customize content. At block 1104, user interface 100 may select timing. At block 1106, user interface 100 may set targeting, reach and content filtering. At block 1108, user interface 100 may place the content within the context of a media portal. At block 1110, user interface 100 may report on the media placement and viewership results. After block 1110, process 1100 may return to block 1102 or any other step, or the process may end.

Figure 15:
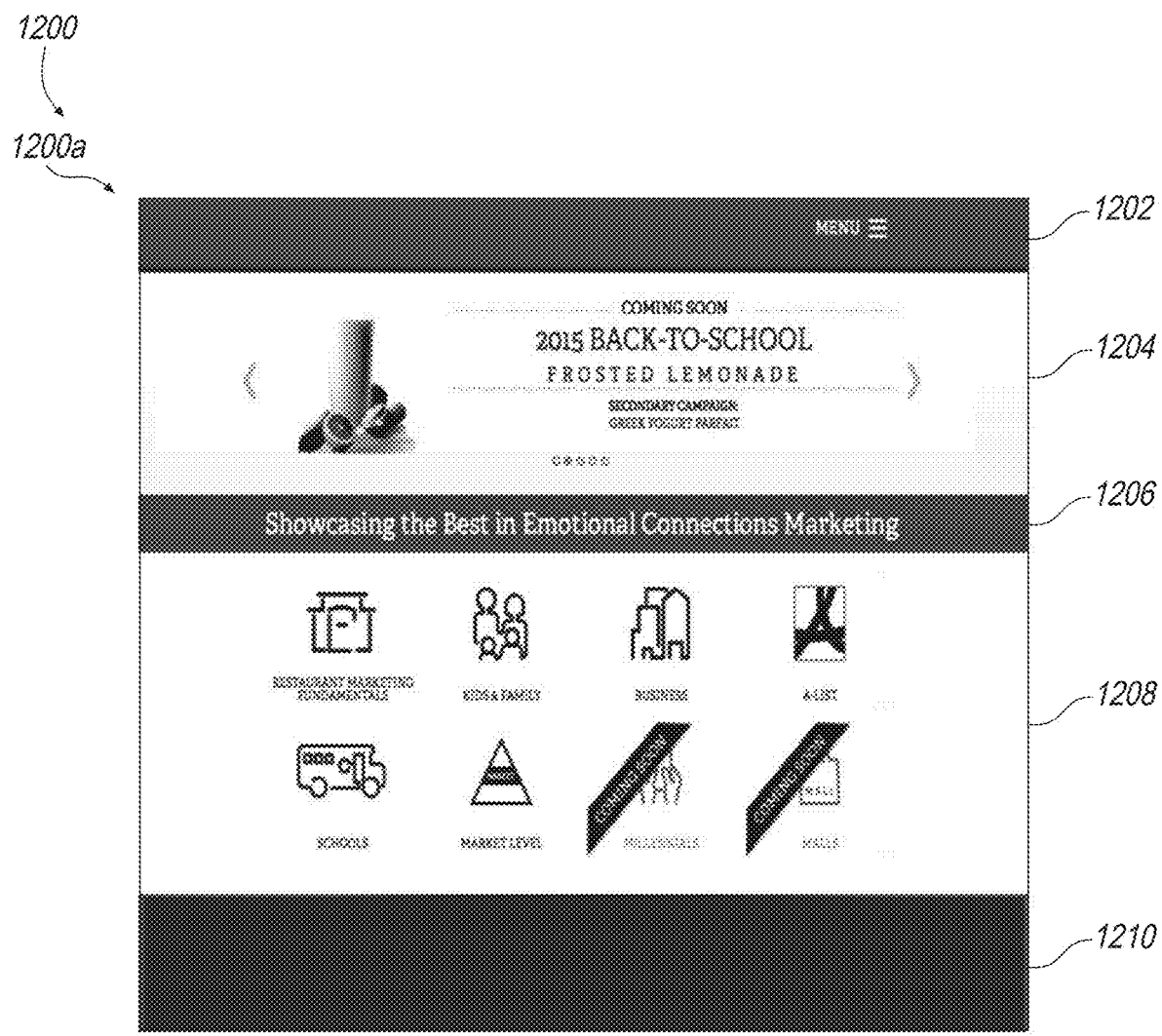
FIG. 15 illustrates an exemplary user interface for selecting and customizing media content including, for example, advertising media content.
Figure 16:
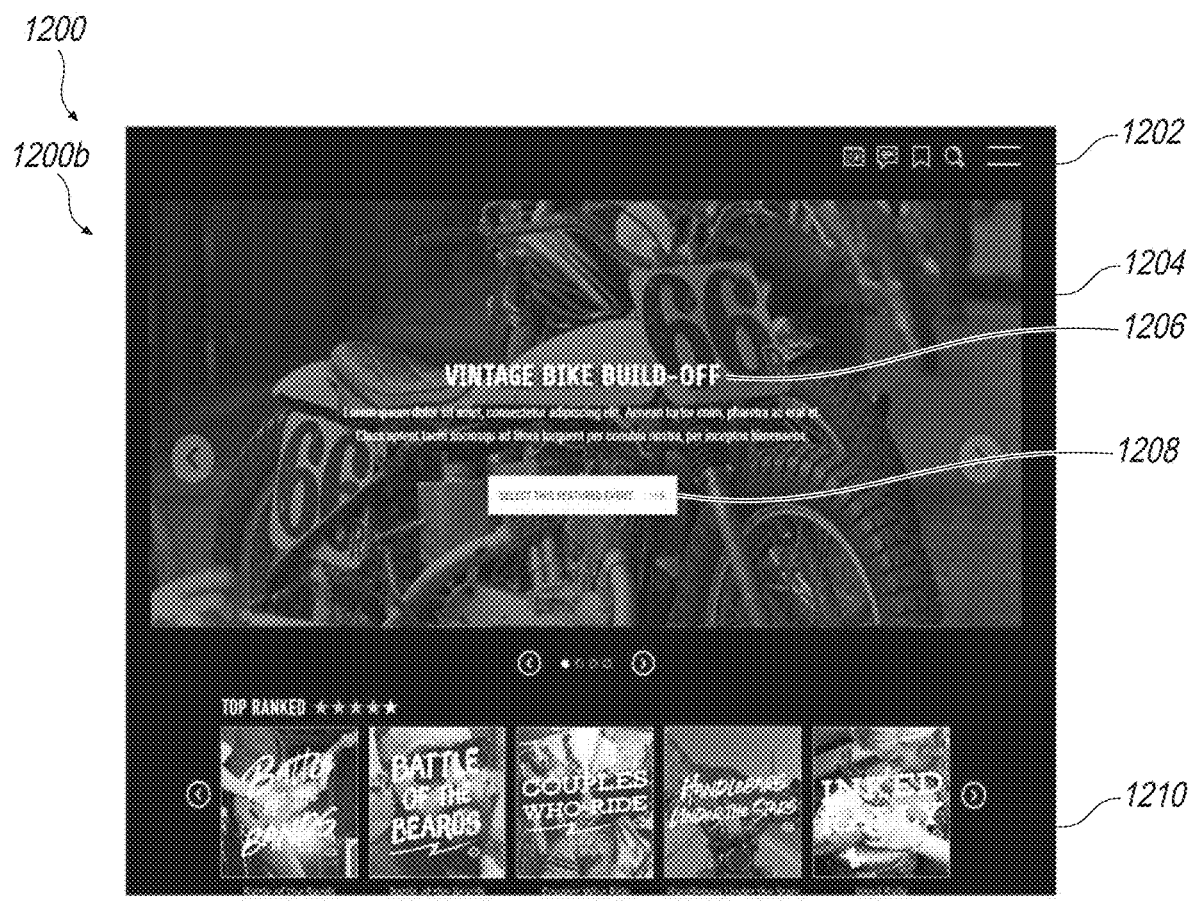
FIG. 16 illustrates an exemplary user interface for selecting and customizing media content.
Figure 17:
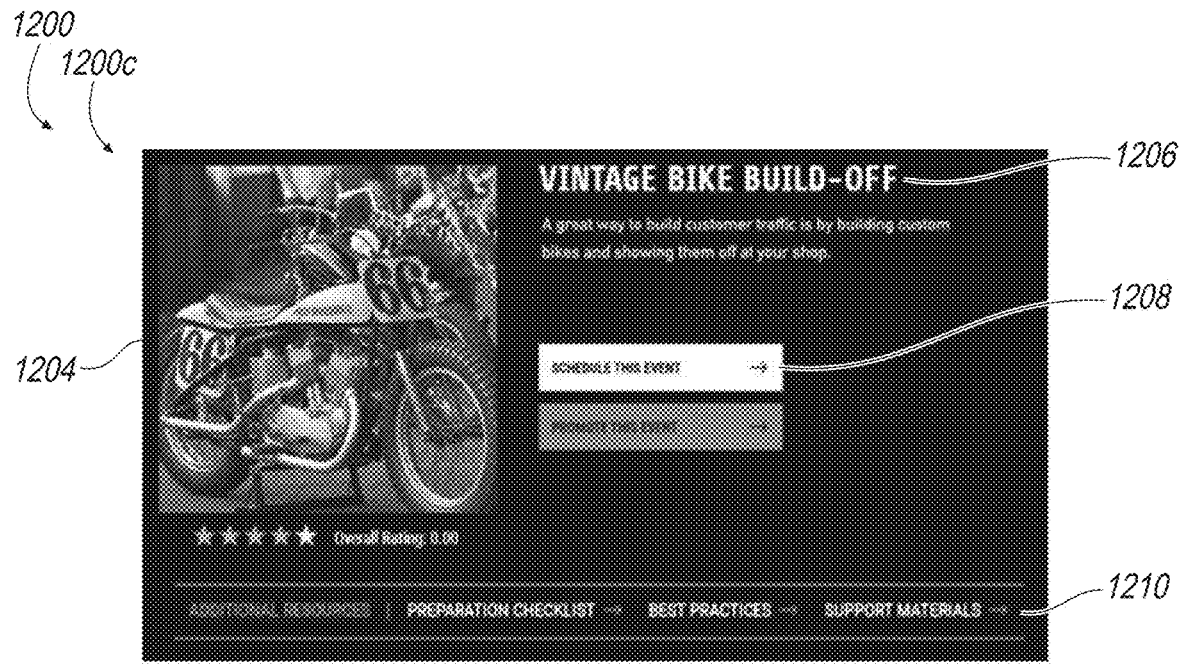
FIG. 17 illustrates an exemplary user interface for selecting and customizing media content.
Figure 18:
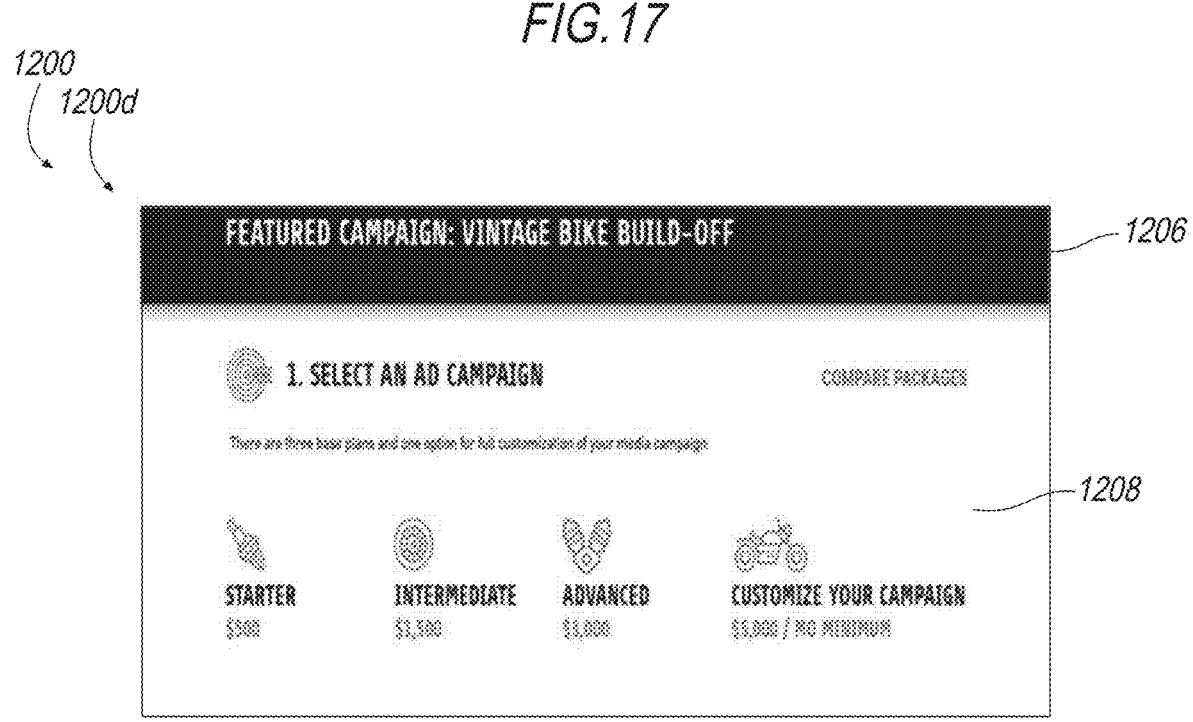
FIG. 18 illustrates an exemplary user interface for selecting and customizing media content.

FIGS. 15-20 illustrate user interfaces 1200a-f configured to, for example, select and customize media content including advertising media content. User interface 1200 may include user interface device 100 or 200 and/or server 30. User interface 1200 may include header or upper menu 1202 with a selection or drop-down menu, media content area 1204 with media content (e.g., advertising media content), header 1206, selection links or icons 1208 (e.g., icons), and lower banner or menu 1210. As shown in FIG. 15, user interface 1200a may include media content area 1204 having dynamic, static, real-time or slideshow content. As shown in FIG. 16, user interface 1200b may include the lower banner or menu 1210 with selection links or icons, selection area 1208 configured to select a featured event, and lower menu 1210 configured to display icons or links to top ranked content. As shown in FIG. 17, user interface 1200c may include media content area 1204 adjacent selection area 1208, selection area 1208 configured to schedule an event, and lower menu 1210 including additional resources, preparation checklist, best practices and support materials. As shown in FIG. 18, user interface 1200d may selection area 1208 with starter, intermediate, advanced and customized options. As shown in FIG. 19, user interface 1200e may include content tags 212, automated publication links 1214 share selection 1216, and boost selection 1218. As shown in FIG. 20, user interface 1200f may include predefined budget selections 1200, user-selected timing ranges 1222, upload options 1224 for sight/visual, sound/audio and motion, text search options 1226, user-selected geographic distribution area 1227, match funds selection 1228, and post add or media option 1230.

User interface 1200 may be configured to select and customize media content (e.g., an advertisement) or a campaign including multiple instances of media content (e.g., a plurality of advertising media content). Media content may be selected from user interface 1200, e.g., from local memory or a remote database. Customization of media content may include pricing, media platforms, headlines, promotional customization, and image manipulation by way of user inputs for customizing and controlling the media content.

With further reference to FIG. 19, user interface 1200 may utilize redesign tools for customization. User interface 1200 may be configured to receive, upload and display media content (e.g., image, video and/or audio content). User interface 1200 may provide social media options to target specific communities by tagging and posing media content (e.g., advertising media content). User interface 1200 may be configured to automatically render text (e.g., promotional message) over image files (e.g., GIF). User interface 1200 may include edit, trim and add graphics capabilities for the media content post, e.g., upload any media content from local memory of user interface device 100 or 200 and/or server 30 or a database in communication with server 30. User interface 1200 may be configured to promote posts, e.g., paid boosts to each of the channels selected by leveraging artificial intelligence and big data analytics. User interface 1200 may be configured to compose music with video and social layers into an uploaded image file (e.g., GIF) for social media. User interface 1200 may be configured to add promotional text, allow addition and removal of text bubbles, editing and trimming of media clips, provide coax external marketing on media posts (e.g., swipe left and right to reveal media sources), and provide paid media options to build a fan club (e.g., boosting button activates upon choosing external media).

Referring to FIG. 20, user interface 1200 may be configured to search media content and composing advertising messages within a submission form. User interface 1200 may be configured to suggest and add headlines, subheads and links along with a suggested message, character count limits, etc. User interface 1200 may suggest and add bold, italic, underline and other formatting. User interface 1200 may provide a message preview prior to distributing the message. User interface 1200 may provide a search of text in media content (e.g., ad text). For example, user interface 1200 may receive text from a user and in response, utilize an internet or database search engine to generate search results and suggest options such as a complimentary color scheme in light of the search engine results. User interface 1200 may also be configured to display information about any necessary fields that are missed and save settings and user inputs before submitting or posting the media content (e.g., advertisement).

Figure 21:
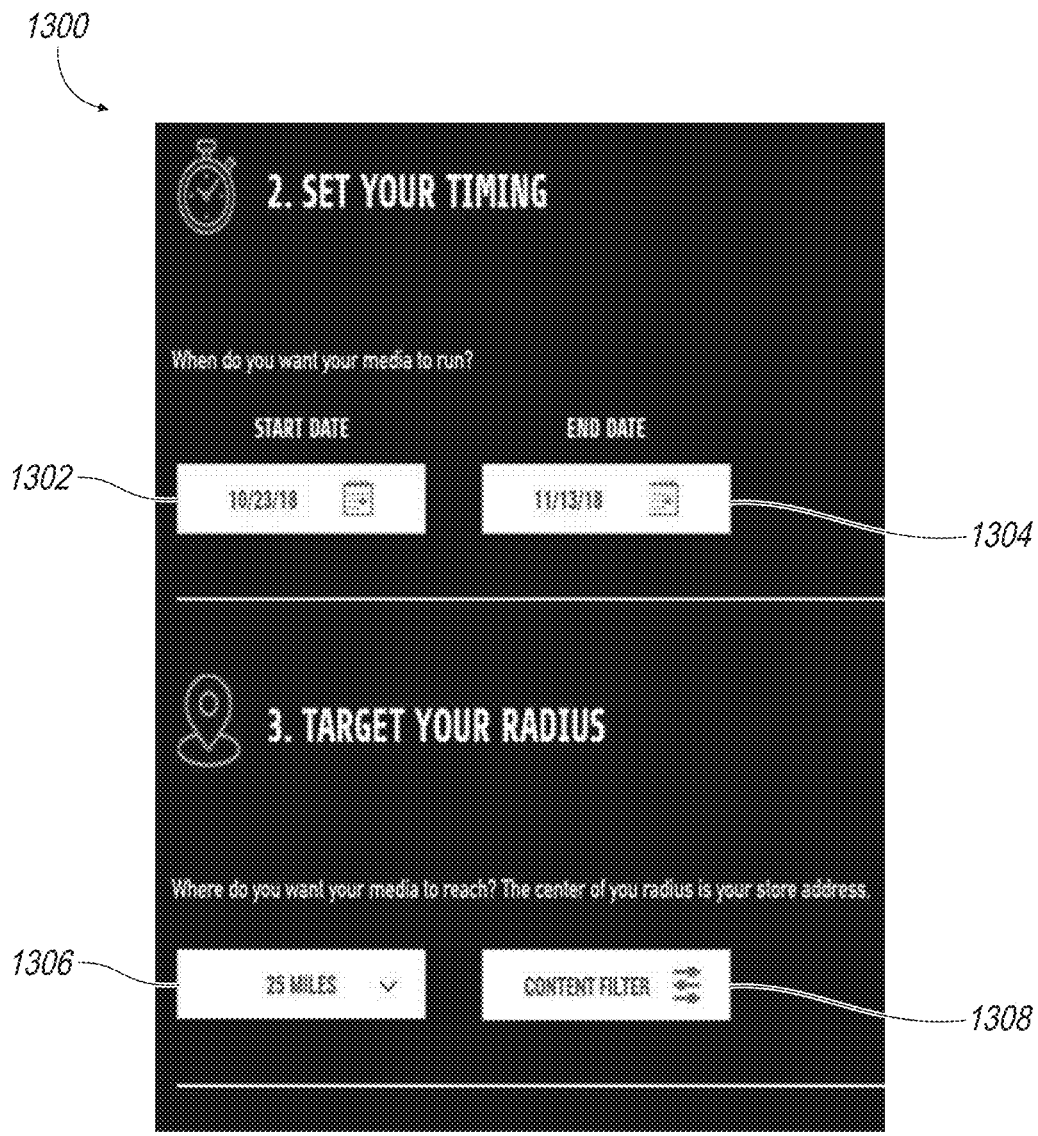
FIG. 21 illustrates an exemplary user interface for targeted placement of media content.
Figure 23:
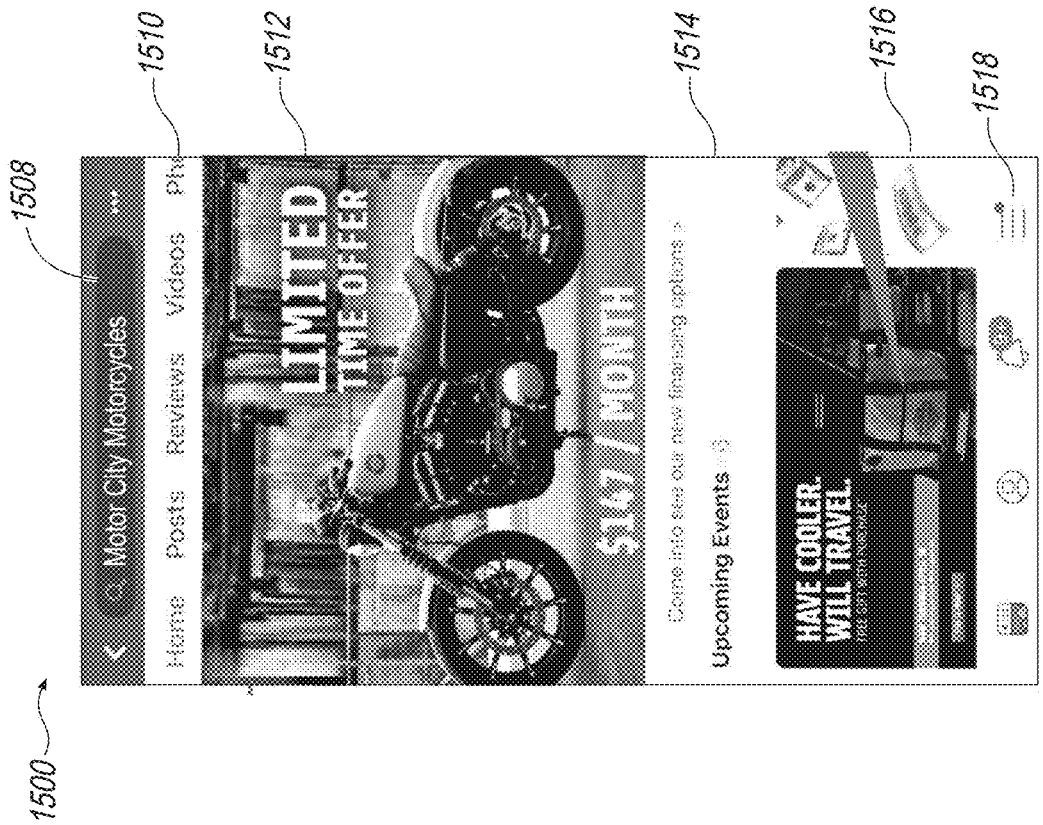
FIG. 23 illustrates an exemplary user interface for targeted placement of media content.
Figure 22:
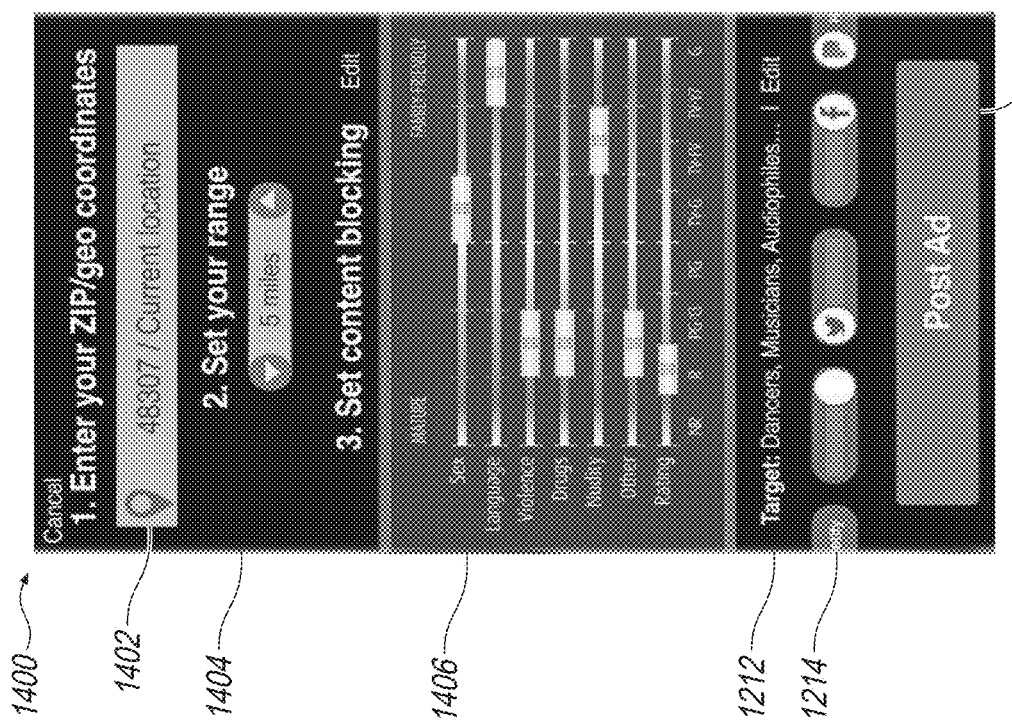
FIG. 22 illustrates an exemplary user interface for targeted placement of media content.

FIGS. 21-23 illustrate user interfaces 1300, 1400 and 1500 configured for targeted placement of media content including, for example, advertising media content. User interfaces 1300, 1400 and 1500 may be configured to, for example, define the timing, distribution radius, content filtering and distribution channels for automated distribution of media content. User interface 1300, 1400 and 1500 may include user interface device 100 or 200 and/or server 30.

As shown in FIG. 21, user interface 1300 may include start date selection 1302, end date selection 1304, duration between the start and end dates, distribution distance 1306 and content filter 1308, e.g., linking to user interface 100. As shown in FIG. 22, user interface 1400 may include current location selection 1402, distribution range 1404, content blocking or filtering 1406, target audiences 1212, target distribution channels 1214, and post media or add 1230. As shown in FIG. 23, user interface 1500 may include search 1508, upper menus 1510, first media content 1512 (e.g., a first advertisement), upcoming events 1514, second media content 1516 (e.g., a second advertisement), and lower menu 1518.

With further reference to FIG. 22, user interface 1400 may be configured to allow the user to defined content for target customers. For example, user interface 1400 may include utilize any of the media content or parental controls operations as described herein. User interface 1400 may be configured for advanced filtering, e.g. providing content targeting for users that extends beyond traditional zip code and channels to include improved filtering, e.g., an appropriateness filter. User interface 1400 may provide geo-targeting by receiving and setting a zip code, geo-coordinates, distance, and/or drop down with multiple locations. User interface 1400 may be configured to block placement of media content (e.g., advertising media content) on background or surrounding content that is not filtered to the predefined specifications of an advertiser. User interface 1400 may include community and channel filtering, e.g., identifying and placing adds within targeted communities. User interface 1400 may be configured to immediately post onto external media channels as identified by the user.

Referring again to FIG. 23, user interface 1500 may be configured to provide a media portal for automated placement and content reviews. User interface 1500 may provide content placement to user-selected media portals according to the median content or parental controls interface described herein. User interface 1500 may provide content review in which content is not placed until the background or surrounding content meets the predefined selections or requirements of the any of the media content or parental controls operations as described herein.

Any of the systems, processes and user interfaces herein may be configured for users to invest in, queue for a user-defined time, and provide a real-time market for the placement of media content such as advertising. For example, any one of or combination of steps 1102, 1104, 1106, 1108 and 1110 may include media content placements (e.g., advertising) that be purchased by or invested into by a user such as an e-commerce buyer, queued for a user-defined time associated with the user selections as described herein, and/or transferred, traded or sold to other users in response to the demand for the media content placements (e.g., advertising) changing over time relative to the user selections, e.g., based on the successful or unsuccessful results associated with the media content placements. Further, user interfaces 1200-1600 of FIGS. 14-24, respectively may receive, generate and display user inputs, media placement results fields, and real-time, market-based pricing associated with media content and the associated investment, purchase, transfer, trade and sales activities. The systems, processes and user interfaces herein may provide a market for, queue and facilitate the real-time exchange of media content placement based on demand for the same.

Figure 24:
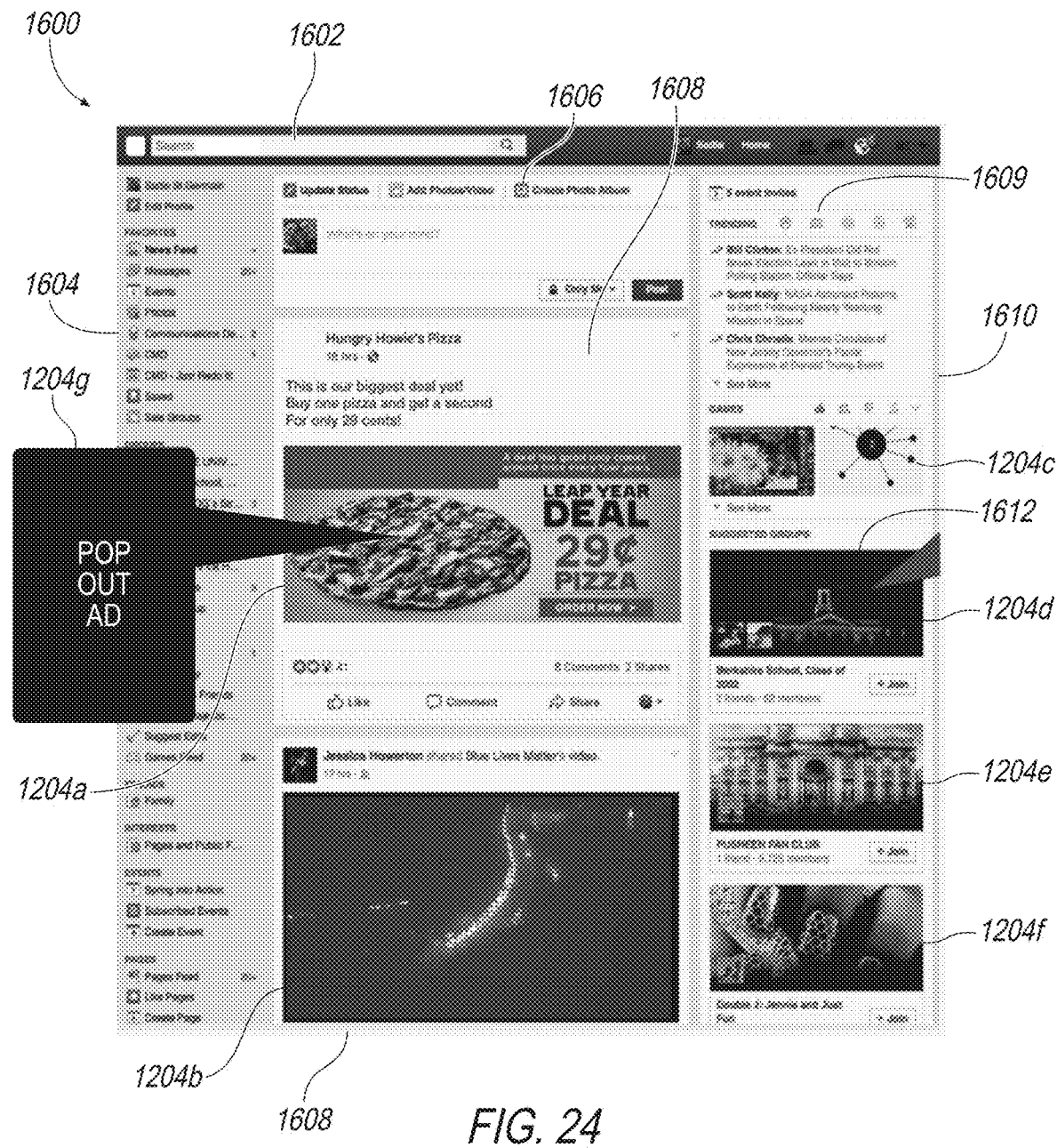
FIG. 24 illustrates an exemplary user interface for automatically placing media content in placement areas.

FIG. 24 illustrates user interface 1600 configured to, for example, automatically place media content (e.g., associated with advertising media content) in placement areas. User interface 1600 may include user interface device 100 or 200 and/or server 30. User interface 1600 may include media content areas 1204a-g, search box 1602, folder area 1604, content entry area 1606, dynamic media area 1608, invitation area 1609, games area 1610, and community groups area 1612. Media content area 1204a may be placed in a central portion of the dynamic media area 1608, or upper, bottom, or side portions thereof. Media content area 1204b may be placed a user-selected distance relative to media content 1204a. Media content area 1204c may be placed a user-selected distance relative to invitation area 1609, games area 1610, or a combination thereof. Media content areas 1204d, 1204e and 1204f may be placed a user-selected distance relative to community groups area 1612. Media content area 1204g may include a pop out area relative to any of media content areas 1204a-f.

User interface 1600 may be configured to target specific audiences. User interface 1600 may include paid advertising media content, organic postings, or boosting in social media, or a combination thereof. User interface 1600 may include art, audio or animated media content. User interface 1600 and/or server 30 may be configured to review surrounding or background content using artificial intelligence and/or human reviews to determine appropriate and inappropriate content. All or any of the options or selections herein may be utilized to place media content (e.g., advertising media content) in, a predefined distance from, or to avoid particular online or social media platforms, or background or surrounding content therein. User interface 1600 may place content near approved media portals or content or away from unapproved media content portals or content as determined by the media content or digital parental controls operations herein.

Figure 25:
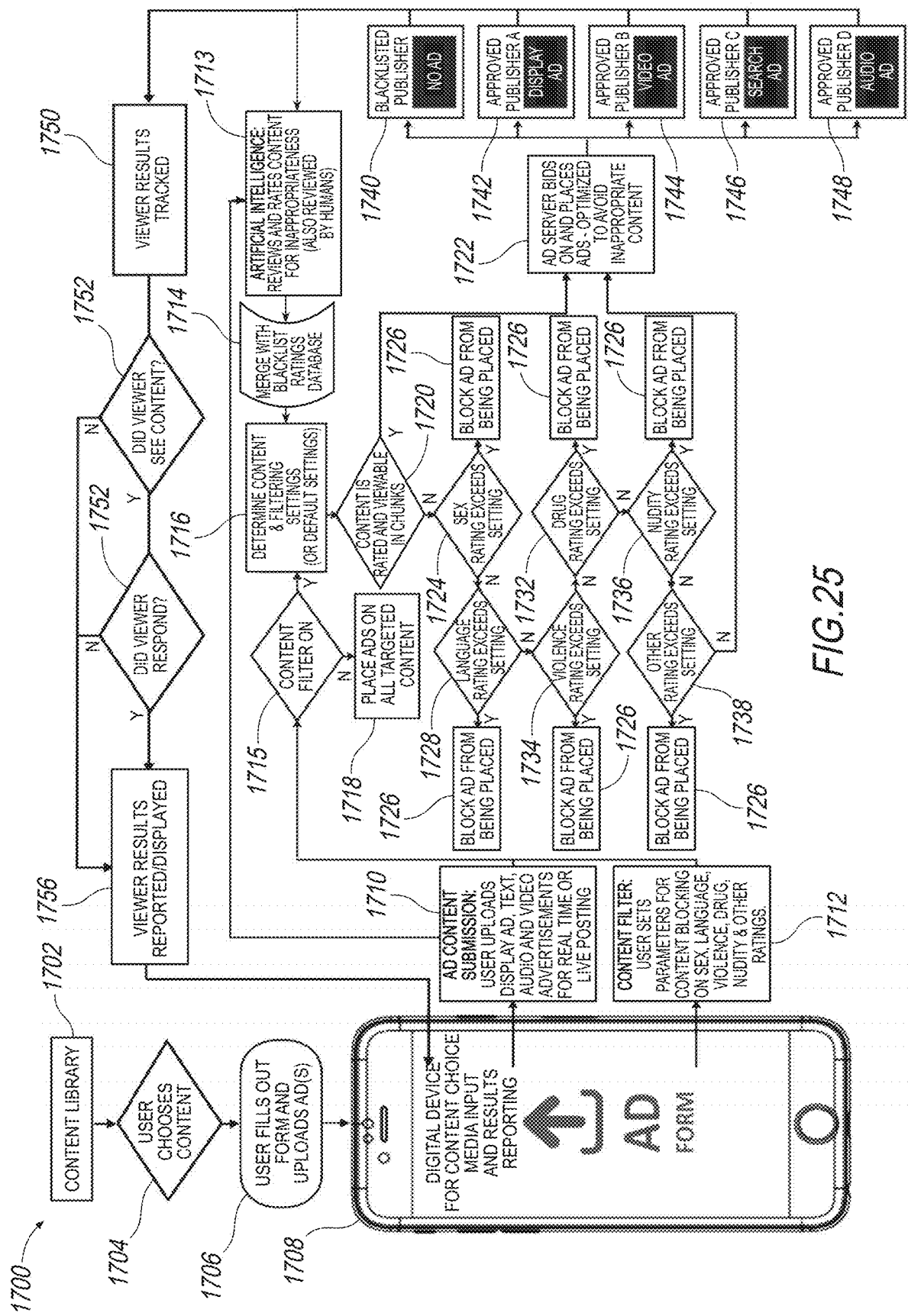
FIG. 25 illustrates an exemplary process for automatically generating and distributing media content.

FIG. 25 illustrates process 1700 for automatically generating and distributing media content, e.g., associated with advertising media content. Process 1700 may include any operation herein, which may be executed by a hardware processor, stored on physical memory or a database, and displayed by a hardware display of any system, user interface or server herein or a combination thereof.

Process 1700 may be configured to selectively block any or all inappropriate video by automatically hiding content from user libraries, or even skipping, muting or obstructing specific words, phrases or scenes from specific content. Process 1700 provides advertisers with the ability to provide and sponsor media content for target audiences with viewers that desire media content without specific inappropriate or offensive content as subjectively defined by each user or objectively by a plurality of users. Process 1700 may utilize the any of the media content or parental controls operations as described therein to filter appropriate and inappropriate content. If any media content does not meet the filtering requirements of the advertiser according to the selections described herein and there exists an edited version of that same content elsewhere (e.g., online or on another database), the media content (e.g., advertisement) will be placed, but the systems herein will automatically create, within the media content itself, a link to the same content available elsewhere with edits that meet the requirements of the brand and/or the user.

At step 1702, the user interface 100 may access media content by way of memory of the user interface or a database in communication with the user interface. At step 1704, the user interface may receive user inputs for selecting and customizing media content. At step 1706, the user interface device 100 may receive user inputs for selecting the timing, targeting, reach, content filtering, and content placement, e.g., by way of a form with user-selected information and upload options. At step 1708, the user inputs may be received and displayed by the user interface device.

At 1710, the user interface device 100 may upload media content to server 30 for distribution online as a real-time or live posting including, for example, advertising media content, text, audio, video, or a combination thereof. At step 1712, the user interface device 100 my receive user inputs to set parameters for content blocking, e.g., sex, language, violence, drugs, nudity, and other categories/ratings.

At step 1713, server 30 may utilize artificial intelligence, human users or a combination hereof may review and rate content relative to target content. The target content may be based on comparisons with content that is positive (e.g., appropriate, desirable or non-offensive) according to a whitelist, negative (e.g., inappropriate, undesirable or offensive) according to a blacklist, or a combination thereof. At step 1714, server 30 may update and merge information with one or more blacklist and/or whitelist ratings databases.

At step 1715, server 30 may determine wither a content filter is on or active. At step 1716, if the content filter is active, server 30 may determine content and filtering settings or default settings from user interface 100. At step 1718, if the content filter is inactive, server 30 may place media content on all target destinations.

At step 1720, the server 30 may be determine if the media content is rated and viewable in portions or chunks. If the media content is rated and viewable, the server 30 may automatically bid on and place advertising media content, e.g., optimized to according to the target content such as by avoiding undesired content and seeking desired content. At step 1726, if the media content is not rated and viewable in portions or chunks, the server 30 may compare the ratings of the media content to user-selected settings.

At steps 1724, 1728, 1732, 1734 1734, 1736 and 1738, the server 30 may be determine if the media content meets or exceeds a user-selected setting for sex, language, drugs, violence, nudity and other ratings, respectively. If the media content meets or exceeds the user-selected setting, the server 30 may block the media content from being placed. At step 1722, if the media content has a rating below the user-selected settings, the server 30 may automatically bid on and place advertising media content, e.g., optimized to according to the target content such as by avoiding undesired content and seeking desired content.

At steps 1740, 1742, 1744, 1746 and 1748, server 30 may determine blacklisted and approved publishing servers for the media content (e.g., advertising media content) and the media content type approved for each approved publishing server. At step 1740, server 30 may not send media content to a blacklisted publishing server. At steps 1742, 1744, 1746 and 1748, server 30 may send media content to approved publishing servers A, B, C and D. Server 30 may send media content with one or multiple content types including display, video, search or audio content or a combination thereof. After steps 1740, 1742, 1744, 1746 and 1748, the information may be provided by the publishing servers to the server 30 thereby updating the content rating information on server 30 for reviewing and rating at step 1713.

At step 1750, user interface device 100, by way of server 30 in communication with the publishing servers, may receive results (e.g., viewer or viewership information) associated with media content (e.g., advertisement). At step 1752, the server 30 may determine if each viewer played the media content, e.g., including the time, duration, location, and number of times the media content was played. The server 30 may determine whether each viewer responded to the media content, e.g., including how each viewer responded, the dwell time and next action of action user, whether each viewer hovered, clicked, viewed or purchased a product or service, or any combination thereof. At step 1756, user interface device 100 may aggregate the results in a report. At step 1708, the user interface device 100 may display the report and the underlying results.

Figure 26:
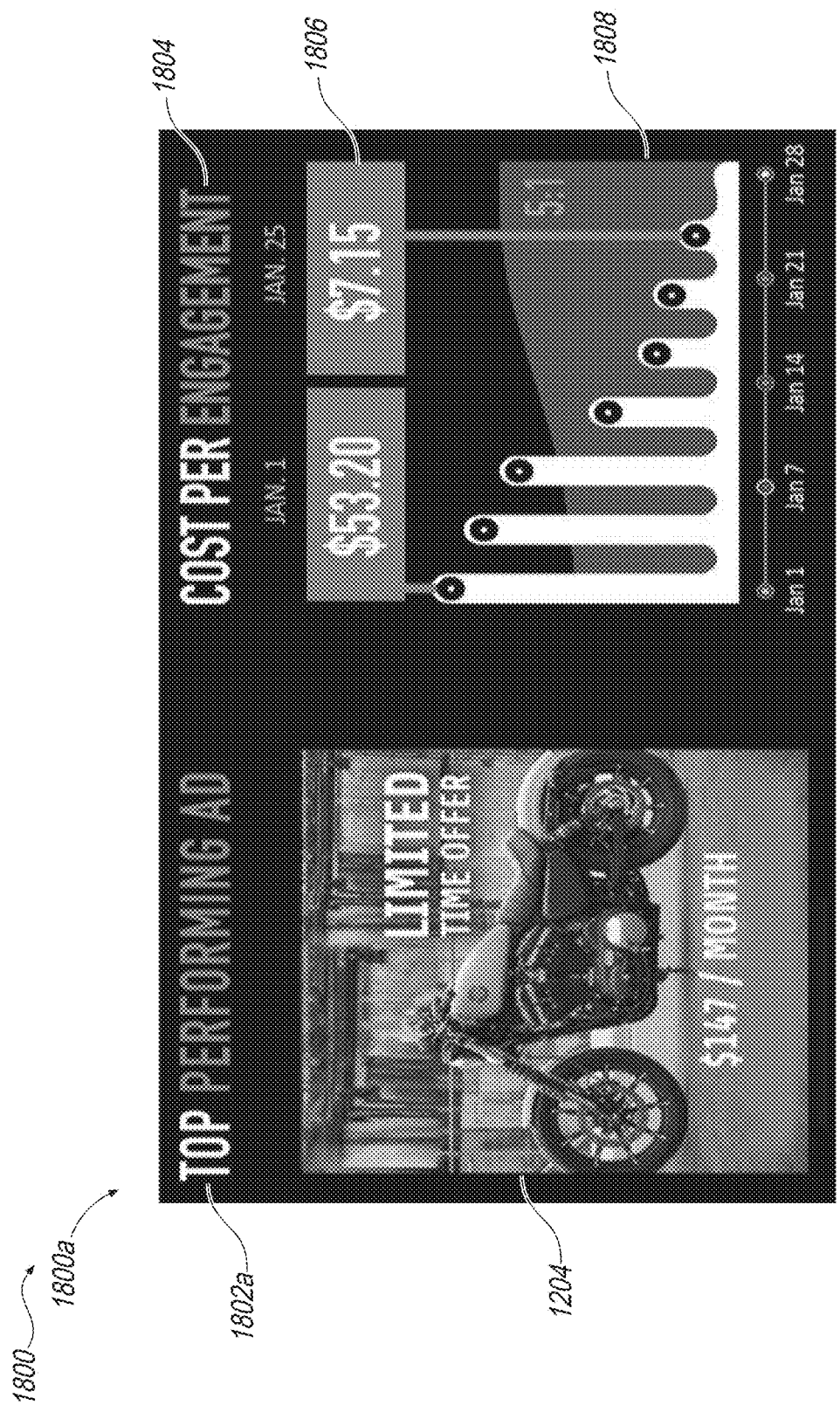
FIG. 26 illustrates an exemplary user interface configured to, for example, display results associated with media content.

FIGS. 26-29 illustrate user interfaces 1800*a-d* for displaying results associated with media content (e.g., advertising media content). User interface 1800 may include user interface device 100 or 200 and/or server 30. As shown in FIG. 26, user interface 1800*a* may be configured to indicate one or more top performing media content (e.g., advertising media content) and an engagement quantifier (e.g., associated cost per engagement). User interface 1800 may include results area 1802 identifying one or more top performing content portions, and results area 1804 including a type of engagement quantifier (e.g., associated cost per engagement) for the one or more top performing content portions. Media content area 1204 may include media content associated with the results areas 1802 and/or 1804. Results area 1806 may include an engagement quantifier for a start date, an end date and a duration for the media content portion. Graphical area 1808 may include a chart or plot illustrating the engagement quantifier at the start date, the end date, and user-selected time increments therebetween.

Figure 27:
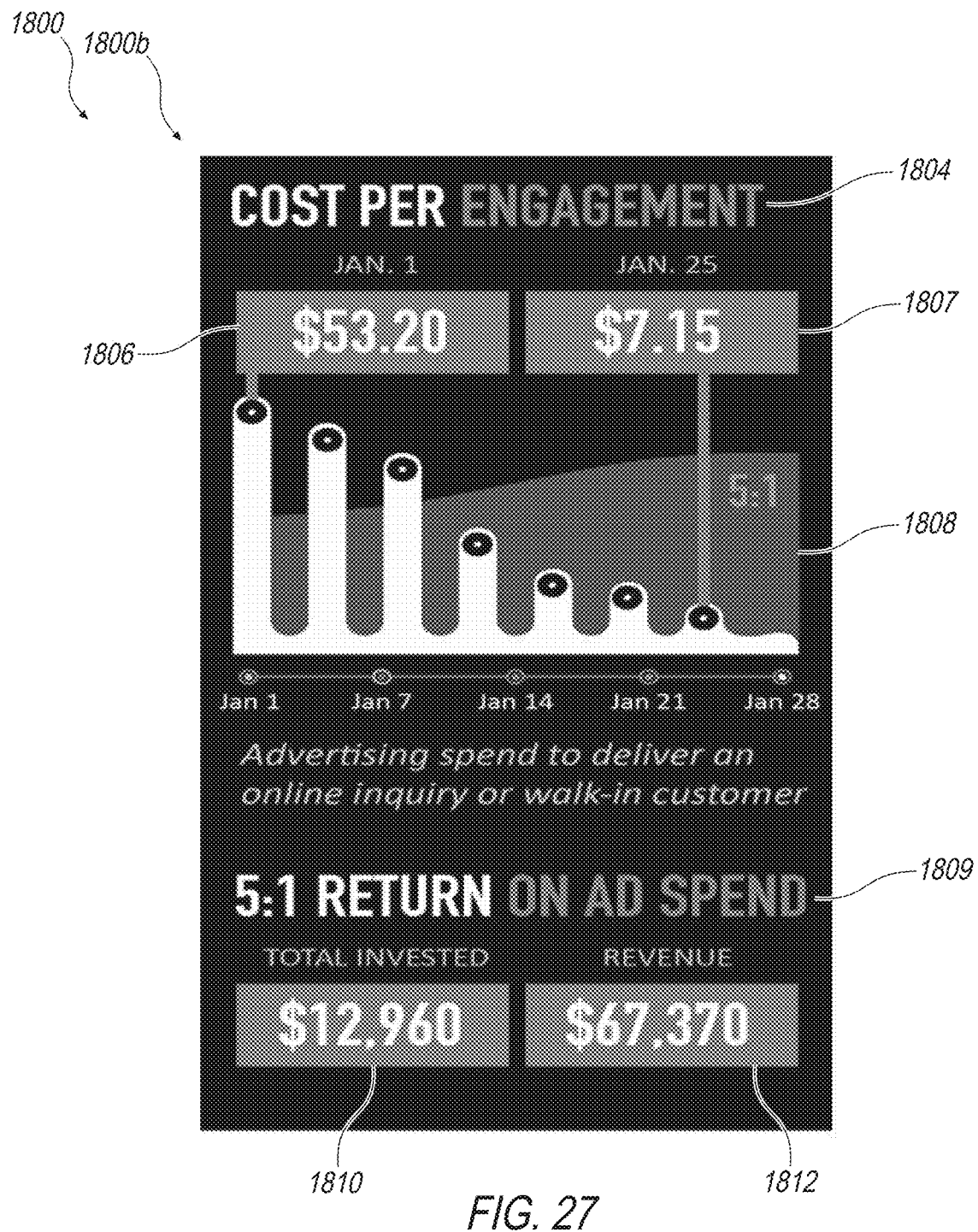
FIG. 27 illustrates an exemplary user interface configured to, for example, display results associated with a plurality of engagement indicators for media content.
Figure 28:
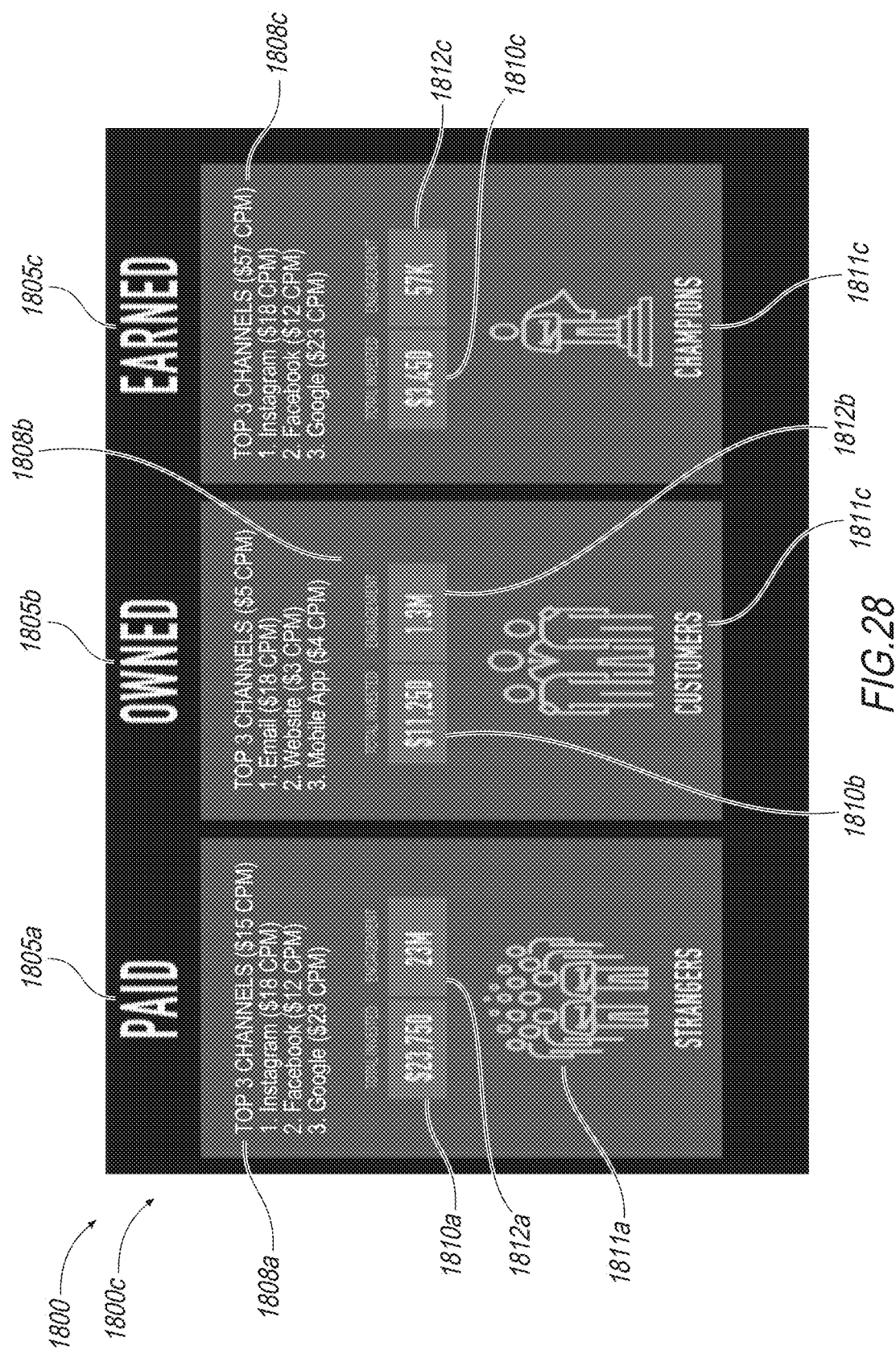
FIG. 28 illustrates an exemplary user interface configured to, for example, display results associated with paid, owned and earned channels of media content.

With further reference to FIG. 27, user interface 1800*b* may be configured to display further results associated with a plurality of engagement indicators for media content including, for example, advertising media content. User interface 1800 may include results area 1804 indicating a first type of engagement indicator (e.g., cost per engagement) and results area 1809 indicating a second type of engagement indicator (e.g., return on content spend). User interface 1800 may include a starting revenue area 1806 (e.g., at a first or start date) and an ending revenue area 1807 (e.g., at a second or ending date). User interface 1800 may include graphical area 1808, total invested area (e.g., between first and second dates) and revenue area (e.g., between first and second dates).

User interface 1800 may include an analytics dashboard for improved reporting. This may include cost per acquisition (CPA) attribution based on a combination of branding, click-through and point-of sale integration by way of mobile, web or accounting systems. User interface 1800 may include walk-in tracking, e.g., tracking store traffic from location positioning via global positioning system (GPS) on mobile computing devices. User interface 1800 may include offer and media content tracking configured to report on media content (e.g., advertising media content such as offers) that perform best in the market.

Referring again to FIG. 28, user interface 1800*c* may be configured to display results associated with paid, owned and earned channels of media content. User interface 1800 may include results areas 1805*a*, 1805*b* and 1805*c* indicating respective paid, owned and earned categories of media content. Results areas 1805*a*, 1805*b* and 1805*c* may include respective top channels 1808*a*, 1808*b* and 1808*c*. Results areas 1805*a*, 1805*b* and 1805*c* may include respective total invested areas 1810*a*, 1810*b* and 1810*c* and respective engagement areas 1812*a*, 1812*b*, and 1812*c*. Results areas 1805*a*, 1805*b* and 1805*c* may include respective graphical indicators 1811*a*, 1811*b* and 1811*c*.

User interface 1800 may be configured for multi-platform reporting. User interfaced 1800 may be configured to report paid, owned and earned media results. User interface 1800 may be configured to offer insights on cost per customer acquisition (CPA) metrics across traditional and digital advertising media (paid), mobile apps as well as websites (owned) and social media and organic search (earned). By comparing and contrasting the analytics reporting, user interface 1800 will provide a multi-factor view of the associated portfolio of media content.

Figure 29:
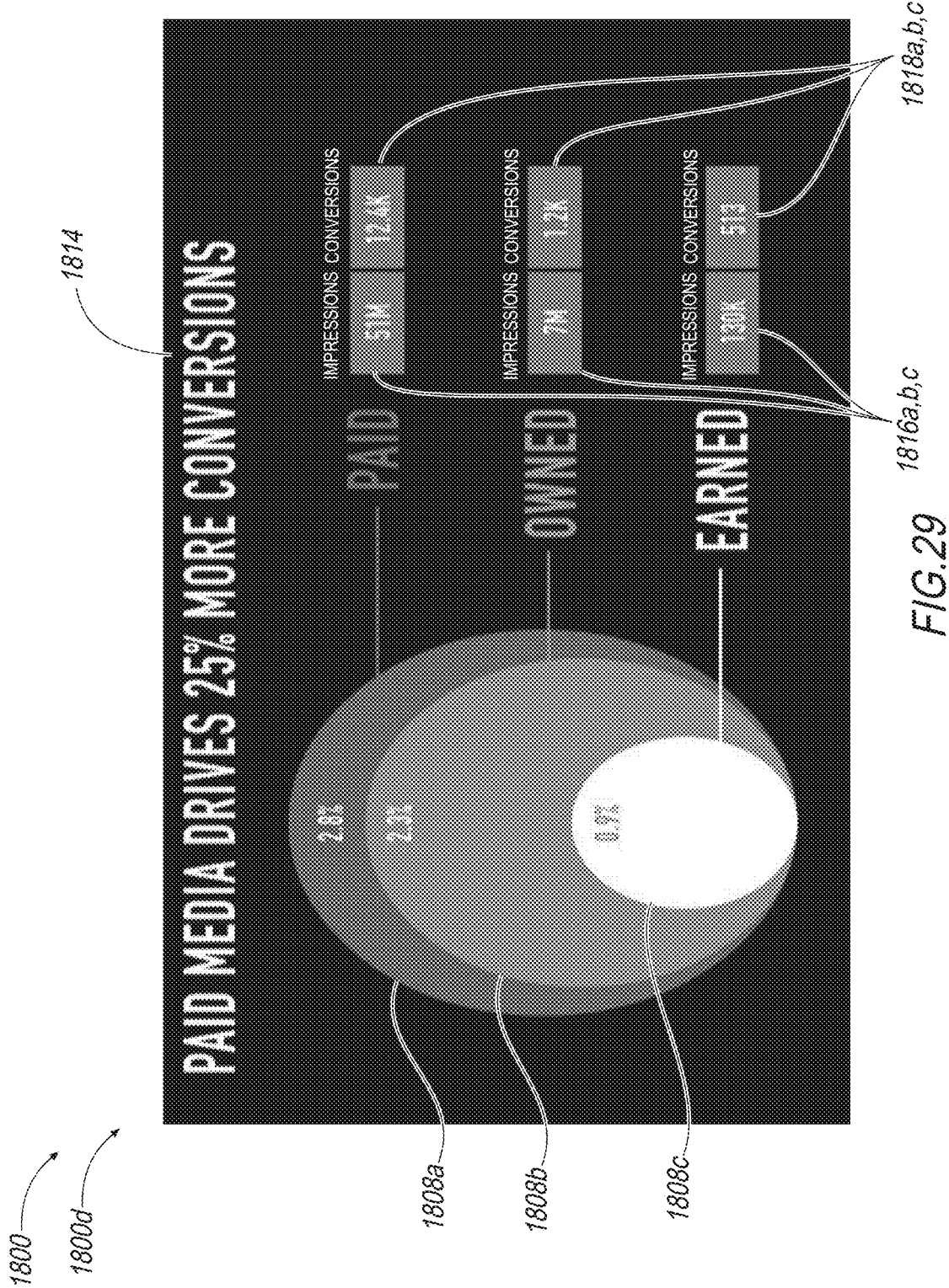
FIG. 29 illustrates an exemplary user interface configured to display, for example, performance results associated with media content.

With further reference to FIG. 29, user interface 1800*d* may be configured to display performance results associated with media content. User interface 1800 may include graphical areas 1808*a*, 1808*b* and 1808*c* associated with respective paid, owned and earned categories of media content. User interface 1800 may include respective impression results 1816*a*, 1816*b* and 1816*c* and respective conversion results 1818*a*, 1818*b* and 1818*c*.

Figure 30:
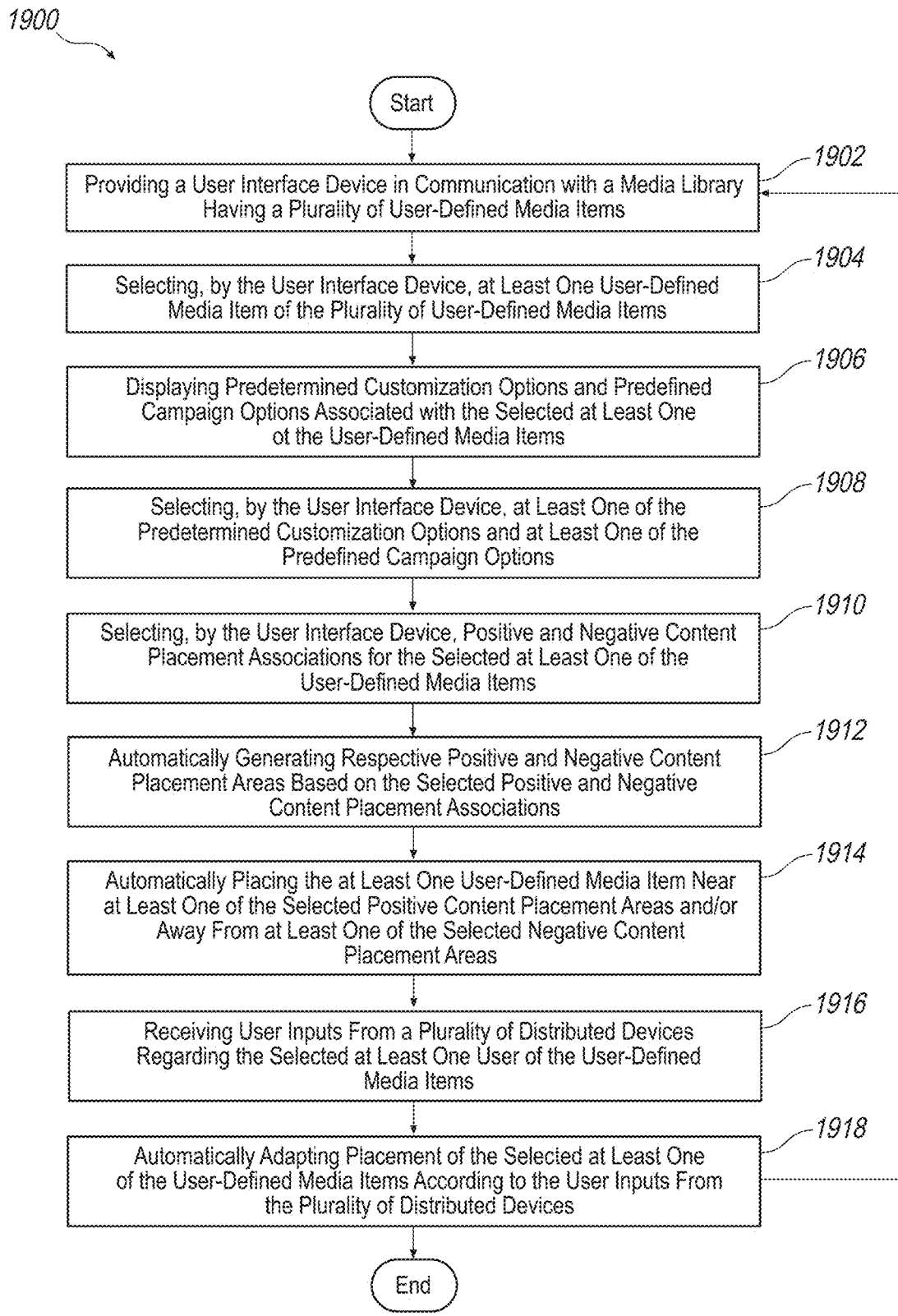
FIG. 30 illustrates an exemplary process for customizing, selecting and placing targeted media content.

FIG. 30 illustrates process 1900 for customizing, selecting and placing media content including, for example, advertising media content. Process 1900 may include any operation herein, which may be executed by a hardware processor, stored on physical memory or a database, and displayed by a hardware display of any system, user interface or server herein or a combination thereof.

At step 1902, user interface 100, user interface 200, and/or server 30 may be provided in communication with a media library (e.g., a database in communication with or memory of user interface device 100) having advertising media content.

At step 1904, user interface 100, user interface 200, and/or server 30 may receive user inputs for the advertising media content.

At step 1906, user interface 100, user interface 200, and/or server 30 may display or cause the display of predefined customization options and predefined campaign options associated with the advertising media content.

At step 1908, user interface 100, user interface 200, and/or server 30 may receive selections including at least one of the predefined customization options and at least one of the predefined campaign options.

At step 1910, user interface 100, user interface 200, and/or server 30 may receive selections including positive and negative content placement associations for the selected at least one of the user-selected media item.

At step 1912, user interface 100, user interface 200, and/or server 30 may automatically generate respective positive and negative content placement areas based on the selected positive and negative content placement associations.

At step 1914, user interface 100, user interface 200, and/or server 30 may automatically place the advertising media content near at least one of the positive content placement areas and/or away from at least one of the negative content placement areas.

At step 1916, user interface 100, user interface 200, and/or server 30 may receive user inputs from a plurality of distributed devices regarding the advertising media content.

At step 1918, user interface 100, user interface 200, and/or server 30 may automatically adapt placement of the advertising media content according to the user inputs from the plurality of distributed devices. After step 1918, process 1900 return to step 1902 or any other step, or the process may end.

Figure 31:
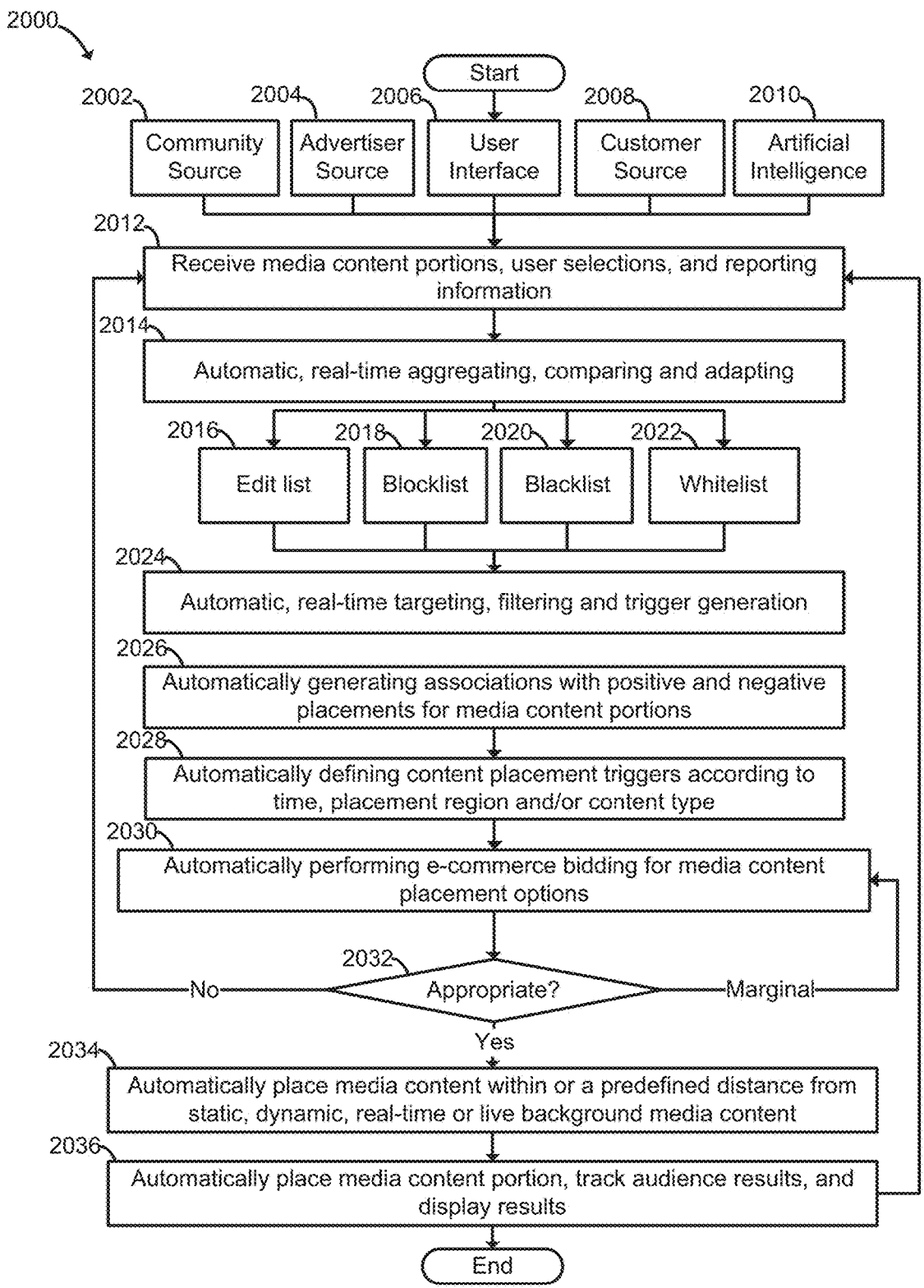
FIG. 31 illustrates an exemplary process for customizing, selecting and placing targeted media content.

FIG. 31 illustrates process 2000 for automated content placement leveraging a plurality of sources for selecting and placing media content including, for example, advertising media content. Process 2000 may include any operation herein, which may be executed by a hardware processor, stored on physical memory or a database, and displayed by a hardware display of any system, user interface or server herein or a combination thereof.

At steps 2002, 2006, 2008, and 2010, process 200 may include receiving, by way of user interface 100, user interface 200, and/or server 30, media content portion (e.g., advertising media content) by way of a plural of sources of media content including a community source, an advertiser source, a user interface (e.g., user interface 100 or 200), customer source, and artificial intelligence.

At step 2012, user interface 100, user interface 200, and/or server 30 may receive media content (e.g., advertising media content), user selections (e.g., customization and/or campaign selections), and reporting information.

At step 2014, user interface 100, user interface 200, and/or server 30 may automatically aggregate, compare and adapt media content.

At steps 2016, 2018, 2020 and 2022, user interface 100, user interface 200, and/or server 30 may compare the media content to edit lists (e.g., listing of media content with all or any undesirable portions edited according to one or more predefined ratings), blocklist (e.g., listing of media content with all or any undesirable portions blocked according to according to one or more predefined ratings), blacklist (e.g., listing of media content with all or any undesirable portions skipped according to one or more predefined ratings), and whitelist (e.g., listing of media desired portions identified according to one or more predefined ratings), At step 2024, user interface 100, user interface 200, and/or server 30 may automatically perform real-time targeting, filtering and trigger generation with respect to the media content.

At step 2026, user interface 100, user interface 200, and/or server 30 may automatically generate associations with positive and negative placements for the media content.

At step 2028, user interface 100, user interface 200, and/or server 30 may automatically define content placement triggers according to time, placement region and/or content type.

At step 2030, user interface 100, user interface 200, and/or server 30 may automatically perform e-commerce bidding for one or more media content placement options.

At step 2032, user interface 100, user interface 200, and/or server 30 may determine whether the media content placement options are appropriate, marginal or inappropriate. If the content placement options are not appropriate according to any or all of the prior steps, process 2000 may return to step 2012 or any other step. If the content placement options are marginal according to any or all of the prior steps, process 2000 may return to step 2030 or any other step, If the content placement options are appropriate, process 2000 may proceed to step 2034.

At step 2034, user interface 100, user interface 200, and/or server 30 may automatically place media content (e.g., advertising media content) within or a predefined distance form static, dynamic, real-time or live background or surrounding media content.

At step 2036, user interface 100, user interface 200, and/or server 30 may place media content according to the above steps, track audience results and display results. After step 2036, process 2000 may return to step 2012 or any other step, or the process may end.

It will be appreciated that the aforementioned methods, systems and devices may be modified to have some components and steps removed, or may have additional components and steps added, all of which are deemed to be within the spirit of the present disclosure. Even though the present disclosure has been described in detail with reference to specific embodiments, it will be appreciated that the various modification and changes can be made to these embodiments without departing from the scope of the present disclosure as set forth in the claims. The specification and the drawings are to be regarded as an illustrative thought instead of merely restrictive thought.

What is claimed:

1. A content controller system for an advertising user to target the placement of advertising media content within a target customer user interface, the system comprising:
   a user interface device in communication with a library of advertising media content, the user interface device providing operations including:
   receive target customer selections associated with placing the advertising media content within a target customer user interface, wherein the target customer selections include a target customer distribution range and target customer content blocking or filtering;
   automatically place and cause to be displayed an approved first advertisement of the advertising media content within a first area of the target customer user interface, in response to the target customer selections;
   automatically place and cause to be displayed an approved second advertisement of the advertising media content within a second area of the target customer user interface and relative to the approved first advertisement within the target customer user interface, in response to the target customer selections; and
   automatically block from the first area and the second area, undesired media content in response to the target customer selections;
   wherein the target customer selections are selected via a target customer selection user interface, the target customer selection user interface includes a plurality of sliding bars that are configured to set respective levels of user-defined content filters relative to a maturity scale for each of a plurality of categories;
   the plurality of sliding bars are configured to be manipulated along the maturity scale between a first end associated with a mature level and a second end associated with a family-friendly level; and
   the target customer selection user interface further includes a rating bar that is configured to set an additional user-defined content filter relative to a rating scale.

2. The content controller system of claim 1, the operations further comprising:
   cause display of predefined customization options associated with the advertising media content; and
   select at least one of the predefined customization options.

3. The content controller system of claim 1, wherein the plurality of categories includes one of a sex category, a language category, a violence category, a drugs category, a nudity category; and
   the rating scale includes at least four among a NR rating, a R rating, a PG-13 rating, a TV-G rating, a TV-FV rating, a TV-Y7 rating, and a G rating.

4. The content controller system of claim 1, the operations further comprising: cause display of predefined campaign options associated with the advertising media content; and select at least one of the predefined campaign options.

5. The content controller system of claim 1, wherein the target customer selections further include a start date selection and an end date selection for the advertising media content to be displayed within the target customer user interface, a target customer location, a target audience selection, and a target distribution channel selection; and
   the target audience selection includes a target customer community selection.

6. The content controller system of claim 1, the operations further comprising:
   automatically generate respective positive and negative content placement areas based on the target customer selections;
   receive user inputs from a plurality of distributed devices regarding the advertising media content; and
   automatically cause adaptation of the placement of the advertising media content according to the user inputs from the plurality of distributed devices.

7. The content controller system of claim 1, wherein the target customer selection user interface further includes a post ad feature that is configured to directly place a third advertisement relative to the first advertisement and the second advertisement within the target customer user interface.

8. The content controller system as claimed in claim 1, further comprising an artificial intelligence engine for placing media.

9. The content controller system as claimed in claim 1, further comprising an artificial intelligence engine for detecting offensive content.

10. The content controller system as claimed in claim 1, further comprising configuring a user interface to promote posts by artificial intelligence.

11. The content controller system as claimed in claim 1, the user interface device is configured to review at least one of surrounding or background content using artificial intelligence.

12. The content controller system as claimed in claim 1, the user interface device is configured to review and rate content relative to target content by using artificial intelligence.

13. The content controller system as claimed in claim 1, the user interface device is configured to receive media content by way of at least one of a community source, an advertiser source, a user source, a customer source, or an artificial intelligence source.

14. A content controller system for an advertising user to target the placement of advertising media content, the system including a user interface device in communication with a library including advertising media content, and the user interface device providing operations comprising:
   receive target customer inputs, wherein the target customer inputs include a target customer distribution range and target customer content blocking or filtering;
   select advertising media content from the library based on the target customer inputs;
   select non-offensive and offensive content placement associations for the advertising media content based on the target customer inputs; and
   automatically cause placement of the advertising media content near non-offensive content placement areas and block from offensive content placement areas, the non-offensive content placement areas are disposed on the user interface device;
   wherein the target customer inputs are selected via a target customer selection user interface, the target customer selection user interface includes a plurality of sliding bars that are configured to set respective levels of user-defined content filters relative to a maturity scale for each of a plurality of categories;

the plurality of sliding bars are configured to be manipulated along the maturity scale between a first end associated with a mature level and a second end associated with a family-friendly level; and the target customer selection user interface further includes a rating bar that is configured to set an additional user-defined content filter relative to a rating scale.

15. The content controller system of claim 14, the operations further comprising: cause display of predefined customization options associated with the advertising media content.

16. The content controller system of claim 15, the operations further comprising: select at least one of the predefined customization options.

17. The content controller system of claim 14, the operations further comprising: cause display predefined campaign options associated with the advertising media content.

18. The content controller system of claim 17, the operations further comprising: select at least one of the predefined campaign options.

19. The content controller system of claim 14, wherein the plurality of categories includes a sex category, a language category, a violence category, a drugs category, a nudity category, and an other category; and the rating scale includes at least four among a NR rating, a R rating, a PG-13 rating, a TV-G rating, a TV-FV rating, a TV-Y7 rating, and a G rating.

20. The content controller system of claim 14, the operations further comprising:

receive user inputs from a plurality of distributed devices regarding the advertising media content; and automatically adapt placement of the advertising media content according to the user inputs from the plurality of distributed devices.

21. A method of a content controller for an advertising user to target the placement of advertising media content, the method comprising:

providing a user interface device in communication with a library including advertising media content;

receiving target customer inputs including a target customer distribution range and target customer content blocking or filtering;

selecting whitelisted and blacklisted content placement associations for the advertising media content based on the target customer inputs; and automatically causing placement of the advertising media content near whitelisted content placement areas and away from blacklisted content placement areas, the whitelisted content placement areas are disposed on the user interface device;

wherein the target customer inputs are selected via a target customer selection user interface, the target customer selection user interface includes a plurality of sliding bars that are configured to set respective levels of user-defined content filters relative to a maturity scale for each of a plurality of categories;

the plurality of sliding bars are configured to be manipulated along the maturity scale between a first end associated with a mature level and a second end associated with a family-friendly level; and the target customer selection user interface further includes a rating bar that is configured to set an additional user-defined content filter relative to a rating scale.

22. The method of claim 21, further comprising: causing display of predefined customization options associated with the advertising media content.

23. The method of claim 22, further comprising: selecting, by the user interface device, at least one of the predefined customization options.

24. The method of claim 21, further comprising:

causing display of predefined campaign options associated with the advertising media content; and selecting at least one of the predefined campaign options.

25. The method of claim 21, wherein the whitelisted content placement areas includes content that is one of appropriate, desirable or non-offensive content, and wherein the blacklisted content placement areas includes content that is one of inappropriate, undesirable or offensive content.

26. The method of claim 21, further comprising:

receiving user inputs form a plurality of user interface devices regarding the advertising media content; and automatically adapting placement of the advertising media content according to the user inputs from the plurality of user interface devices.

* * * * *